United States Patent
Yang et al.

(10) Patent No.: US 12,284,042 B2
(45) Date of Patent: Apr. 22, 2025

(54) METHOD AND APPARATUS FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 638 days.

(21) Appl. No.: 17/267,735

(22) PCT Filed: Aug. 12, 2019

(86) PCT No.: PCT/KR2019/010186
§ 371 (c)(1),
(2) Date: Feb. 10, 2021

(87) PCT Pub. No.: WO2020/032759
PCT Pub. Date: Feb. 13, 2020

(65) Prior Publication Data
US 2021/0320761 A1     Oct. 14, 2021

(30) Foreign Application Priority Data

Aug. 10, 2018   (KR) .......... 10-2018-0094040
Jan. 11, 2019   (KR) .......... 10-2019-0004182
(Continued)

(51) Int. Cl.
*H04L 1/1829*   (2023.01)
*H04L 5/00*     (2006.01)
(Continued)

(52) U.S. Cl.
CPC ......... *H04L 1/1854* (2013.01); *H04L 5/0055* (2013.01); *H04W 72/1273* (2013.01);
(Continued)

(58) Field of Classification Search
None
See application file for complete search history.

(56) References Cited

U.S. PATENT DOCUMENTS

2020/0295882 A1* 9/2020 Wang .............. H04L 1/1896
2021/0075556 A1* 3/2021 Karaki ............ H04B 7/0456
(Continued)

FOREIGN PATENT DOCUMENTS

WO   WO2016108658       7/2016

OTHER PUBLICATIONS

CATT, "Remaining issues on NR HARQ timing," R1-1803758, 3GPP TSG RAN WG1 Meeting #92bis, Sanya, China, dated Apr. 16-20, 2018, 9 pages.
(Continued)

*Primary Examiner* — Jenkey Van
(74) *Attorney, Agent, or Firm* — Fish & Richardson P.C.

(57) ABSTRACT

The present invention relates to a wireless communication system and, more particularly, to a method and apparatus therefor, the method comprising the steps of: receiving scheduling information including a DAI value and a 1-bit indicator, the DAI value indicating a modulo value for a scheduling order; receiving data on the basis of the scheduling information; and transmitting A/N feedback including A/N information about the data, wherein a position of the
(Continued)

(a) DAI sequence flag (DSF) is toggled (b) DAI sequence flag (DSF) is not toggled A/N information in the A/N feedback is determined based on (1) the DAI value and (2) a bit value of the 1-bit indicator or on whether the 1-bit indicator is toggled.

7 Claims, 20 Drawing Sheets

(30) Foreign Application Priority Data

| | | |
|---|---|---|
| Jan. 24, 2019 | (KR) | 10-2019-0009469 |
| Feb. 15, 2019 | (KR) | 10-2019-0017674 |
| Mar. 29, 2019 | (KR) | 10-2019-0036842 |

(51) Int. Cl.
*H04W 72/1273* (2023.01)
*H04W 72/21* (2023.01)
*H04W 72/23* (2023.01)
*H04W 74/0833* (2024.01)

(52) U.S. Cl.
CPC ........... *H04W 72/21* (2023.01); *H04W 72/23* (2023.01); *H04W 74/0833* (2013.01)

(56) References Cited

U.S. PATENT DOCUMENTS

2021/0234643 A1* 7/2021 Wang .................... H04L 1/1887
2021/0344451 A1* 11/2021 Hedayat ................ H04L 1/1861

OTHER PUBLICATIONS

Huawei, HiSilicon, "Remaining issues on HARQ management," R1-1802697, 3GPP TSG RAN WG1 Meeting #92, Athens, Greece, dated Feb. 26-Mar. 2, 2018, 17 pages.

Huawei, HiSilicon, "Remaining issues on scheduling and Harq," R1-1804431, 3GPP TSG RAN WG1 Meeting #92bis, Sanya, China, Apr. 16-20, 2018, 18 pages.

Nokia, Nokia Shanghai Bell, "Remaining open items on UCI multiplexing," R1-1804460, 3GPP TSG RAN WG1 Meeting #92bis, Sanya, China, dated Apr. 16-20, 2018, 7 pages.

PCT International Search Report and Written Opinion in International Appln. No. PCT/KR2019/010186, dated Dec. 6, 2019, 15 pages (with English translation).

* cited by examiner

FIG. 9
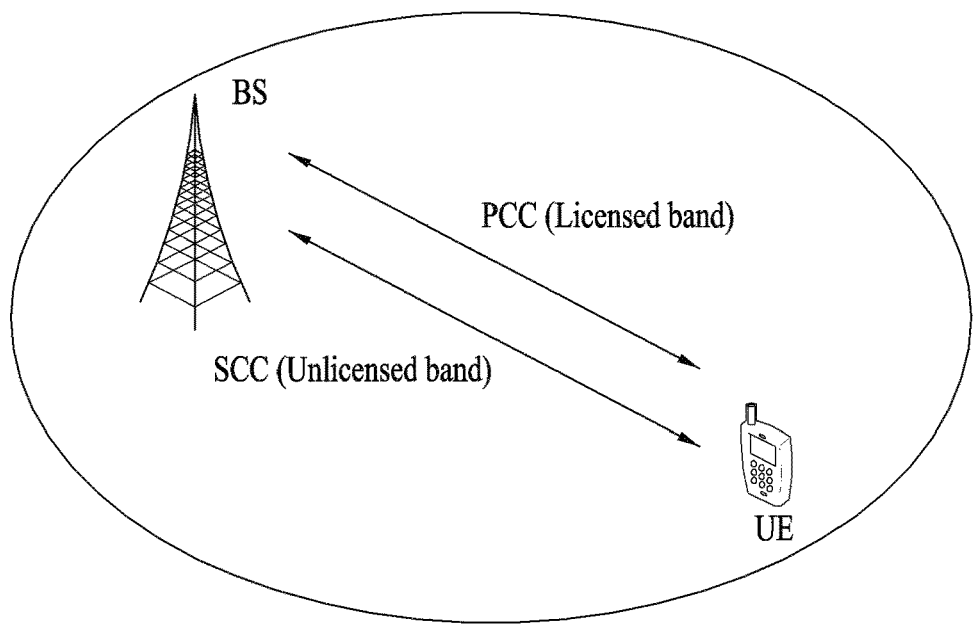
(a) Carrier aggregation between L-band and U-band
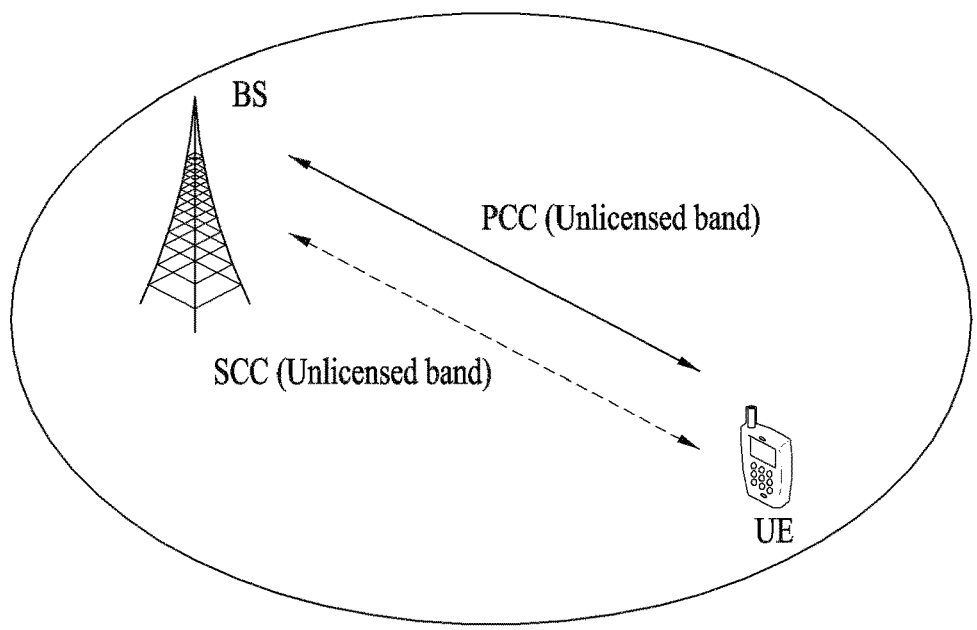
(b) Standalone U-band(s)

FIG. 12
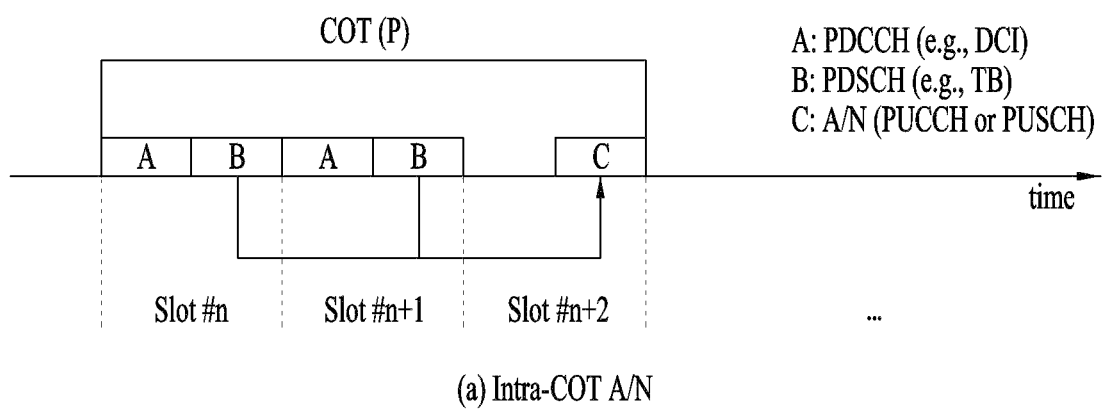
(a) Intra-COT A/N
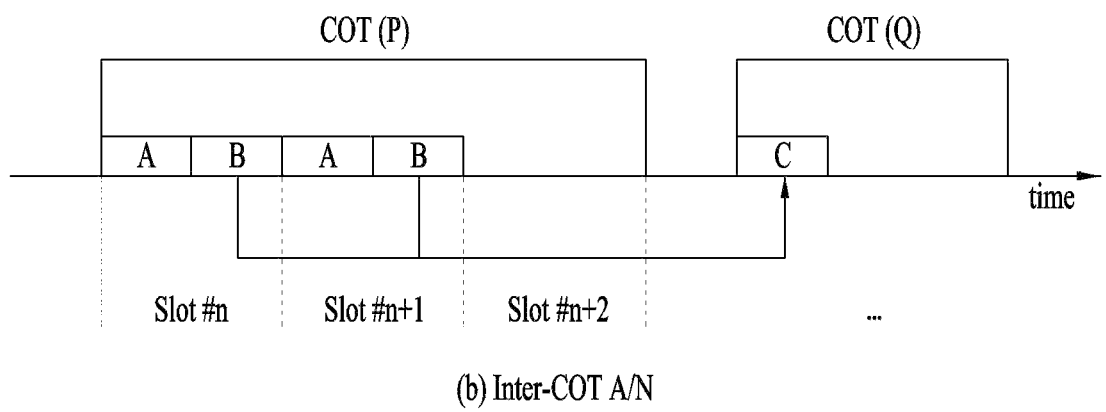
(b) Inter-COT A/N

FIG. 13
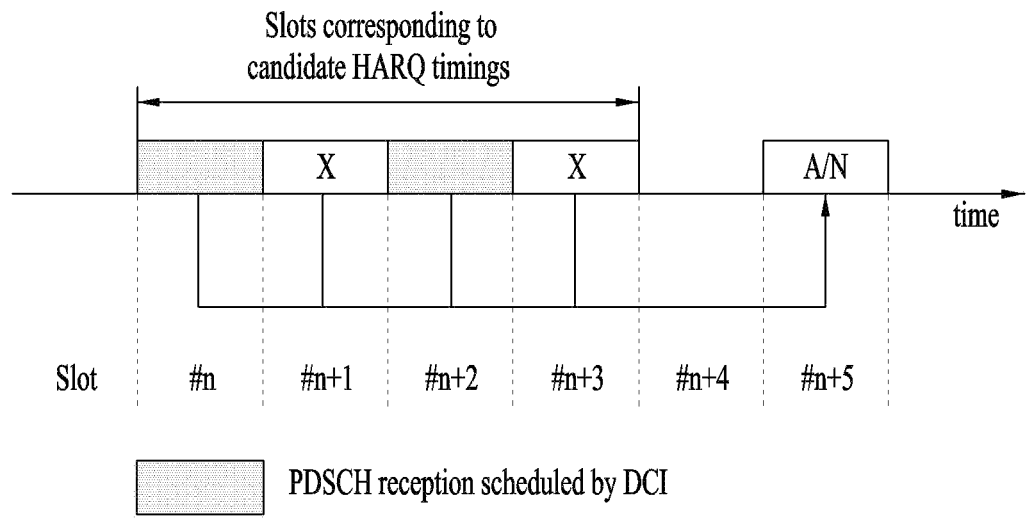
(a) t-A/N without DAI signaling
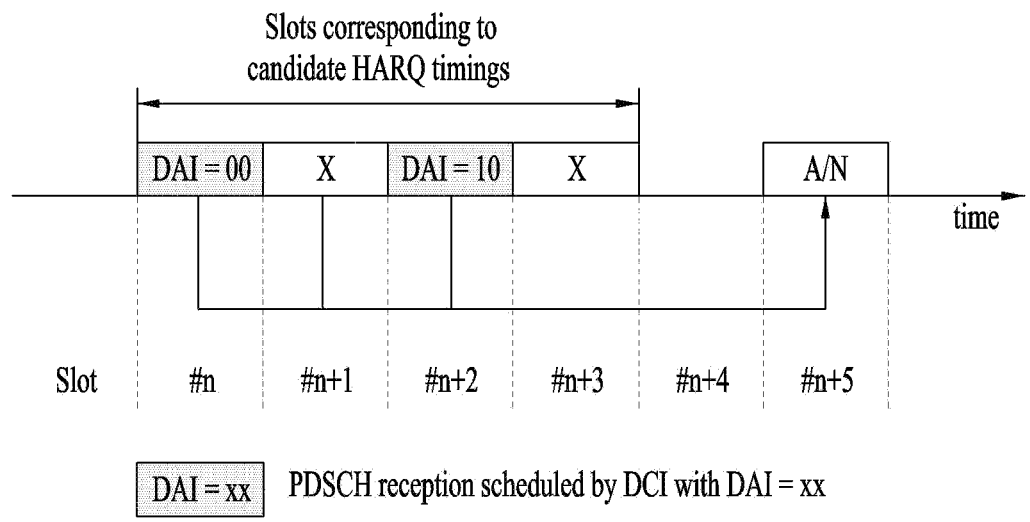
(b) t-A/N with DAI signaling

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2019/010186, filed on Aug. 12, 2019, which claims the benefit of Korean Application Nos. 10-2019-0036842, filed on Mar. 29, 2019, 10-2019-0017674, filed on Feb. 15, 2019, 10-2019-0009469, filed on Jan. 24, 2019, 10-2019-0004182, filed on Jan. 11, 2019, and 10-2018-0094040, filed on Aug. 10, 2018. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting a signal by a wireless apparatus in a wireless communication system includes receiving scheduling information including a downlink assignment index (DAI) value and a 1-bit indicator, the DAI value representing a modulo value of a scheduling order, receiving data based on the scheduling information, and transmitting an acknowledgment/negative acknowledgment (A/N) feedback including A/N information for the data. The position of the A/N information in the A/N feedback is determined based on (1) the DAI value and (2) a bit value of the 1-bit indicator or whether the 1-bit indicator has been toggled.

In another aspect of the present disclosure, a wireless apparatus used in a wireless communication system includes a memory and a processor. The processor is configured to receive scheduling information including a DAI value and a 1-bit indicator, the DAI value representing a modulo value of a scheduling order, receive data based on the scheduling information, and transmit an A/N feedback including A/N information for the data. The position of the A/N information in the A/N feedback is determined based on (1) the DAI value and (2) a bit value of the 1-bit indicator or whether the 1-bit indicator has been toggled.

The A/N feedback may be configured based on a DAI sequence determined between two DAI sequences based on the bit value of the 1-bit indicator or whether the 1-bit indicator has been toggled, and the DAI value indicates a scheduling order based on the determined DAI sequence.

A first DAI sequence of the two DAI sequences may correspond to a bit value 'a' or a toggled value of the 1-bit indicator, a second DAI sequence of the two DAI sequences may correspond to a bit value 'b' or a non-toggled value of the 1-bit indicator, and (a, b) may be (0, 1) or (1, 0).

The DAI may indicate a scheduling order of the data within a time window, a first DAI sequence of the two DAI sequences may correspond to a bit value 'a' or a toggled value of the 1-bit indicator, a second DAI sequence of the two DAI sequences may correspond to a bit value 'b' or a non-toggled value of the 1-bit indicator, and (a, b) may be (0, 1) or (1, 0).

Based on the 1-bit indicator having a bit value 'a' or a toggled value, the DAI value may indicate a scheduling order only for data after a previous A/N feedback, based on the 1-bit indicator having a bit value 'b' or a non-toggled value, the DAI value may indicate a scheduling order for (i) data related to the previous A/N feedback and (ii) data after the A/N feedback, and (a, b) may be (0, 1) or (1, 0).

Based on the 1-bit indicator having a bit value 'a' or a toggled value, the A/N feedback may indicate only a data reception state after a previous A/N feedback, based on the 1-bit indicator having a bit value 'b' or a non-toggled value, the A/N feedback may indicate a data reception state after (i) the previous A/N feedback and (ii) the A/N feedback, and (a, b) may be (0, 1) or (1, 0).

The transmission of the A/N feedback may be performed based on a listen-before-talk (LBT) result.

The wireless apparatus may include an autonomous driving vehicle communicable with at least a user equipment (UE), a network, and another autonomous driving vehicle other than the wireless apparatus.

Advantageous Effects

According to the present disclosure, a wireless signal may be efficiently transmitted and received in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the present disclosure and together with the description serve to explain the principle of the present disclosure.

FIG. 9 illustrates a wireless communication system supporting an unlicensed band;

FIGS. 12 to 18 illustrate signal transmission according to the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). $3^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
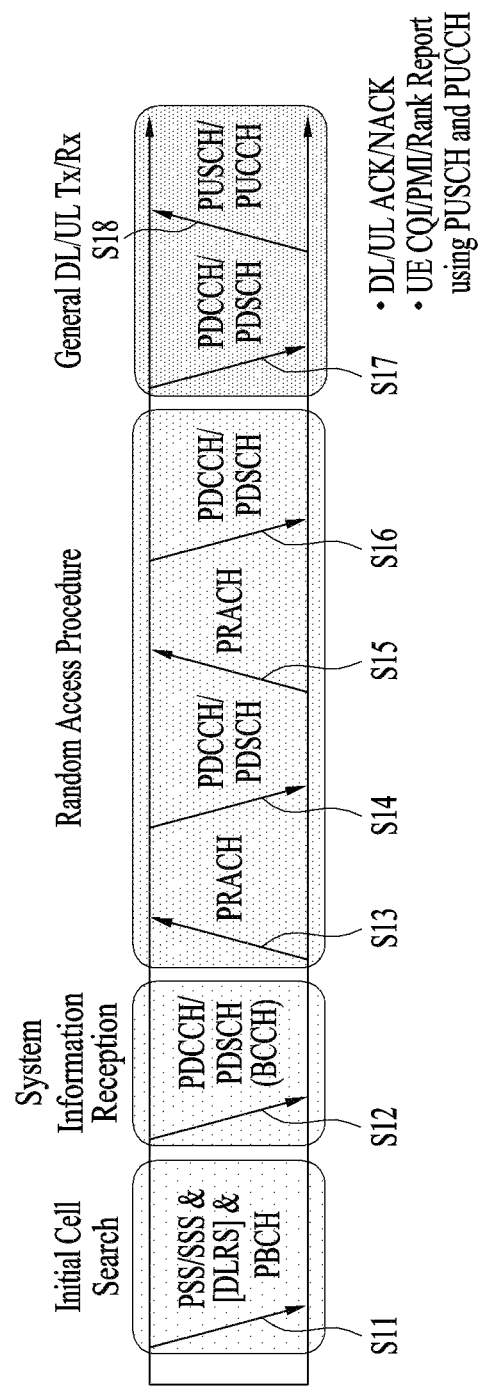
FIG. 1 illustrates physical channels and a general signal transmission method using the physical channels in a $3^{rd}$ generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
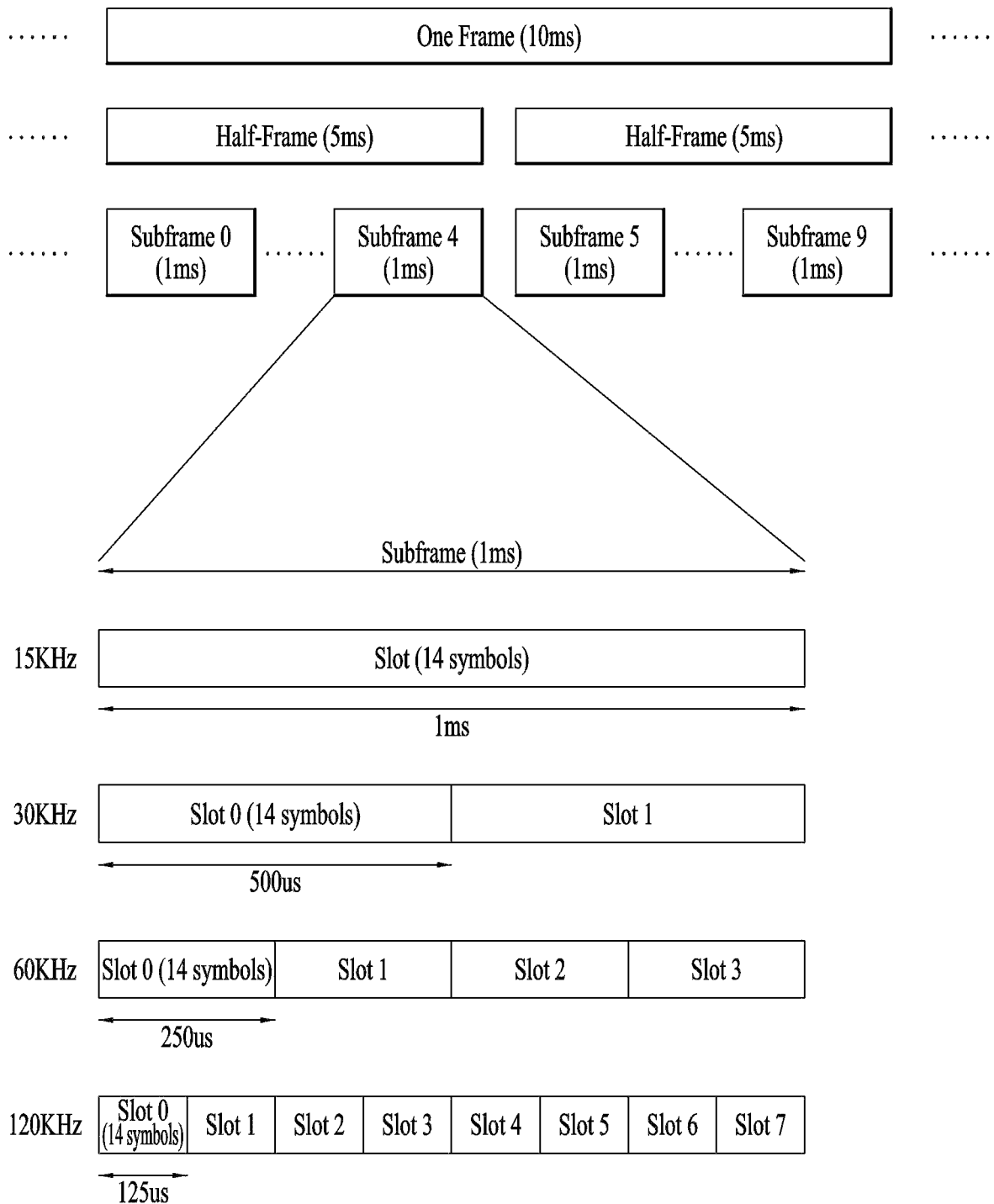
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol).

Figure 3:
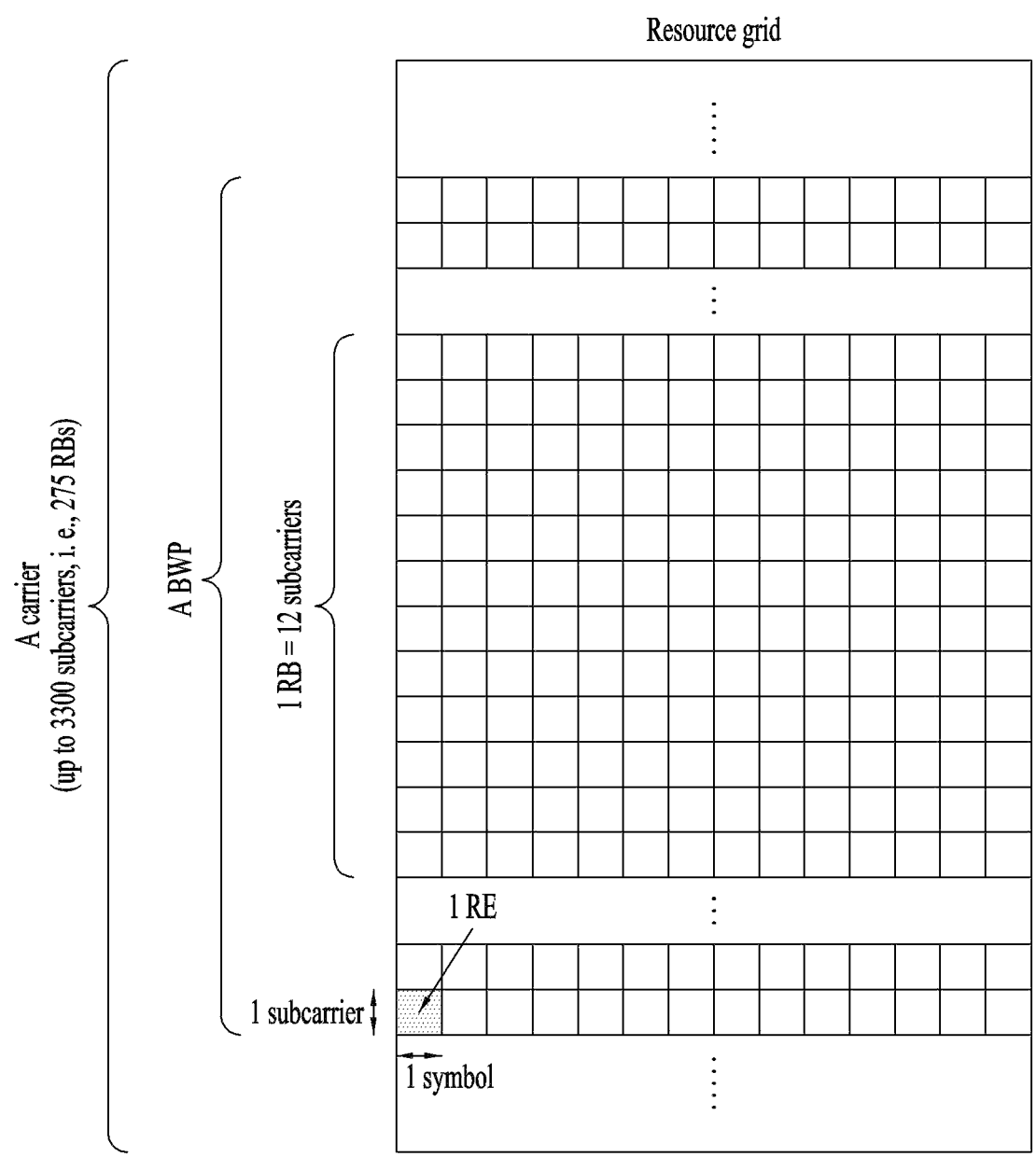
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
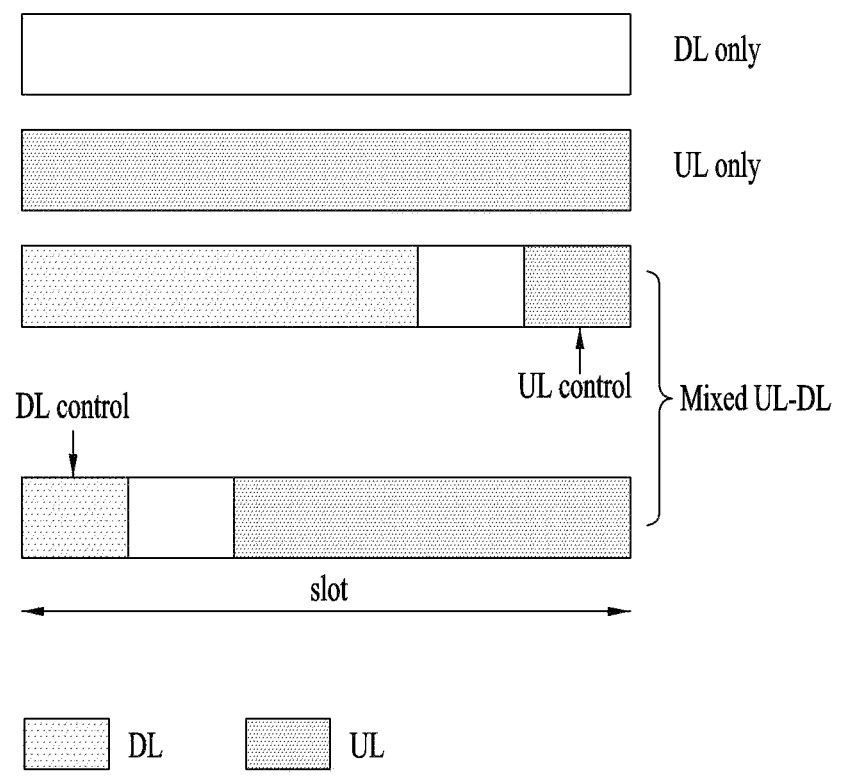
FIG. 4 illustrates a self-contained slot structure.

FIG. 4 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

Figure 5:
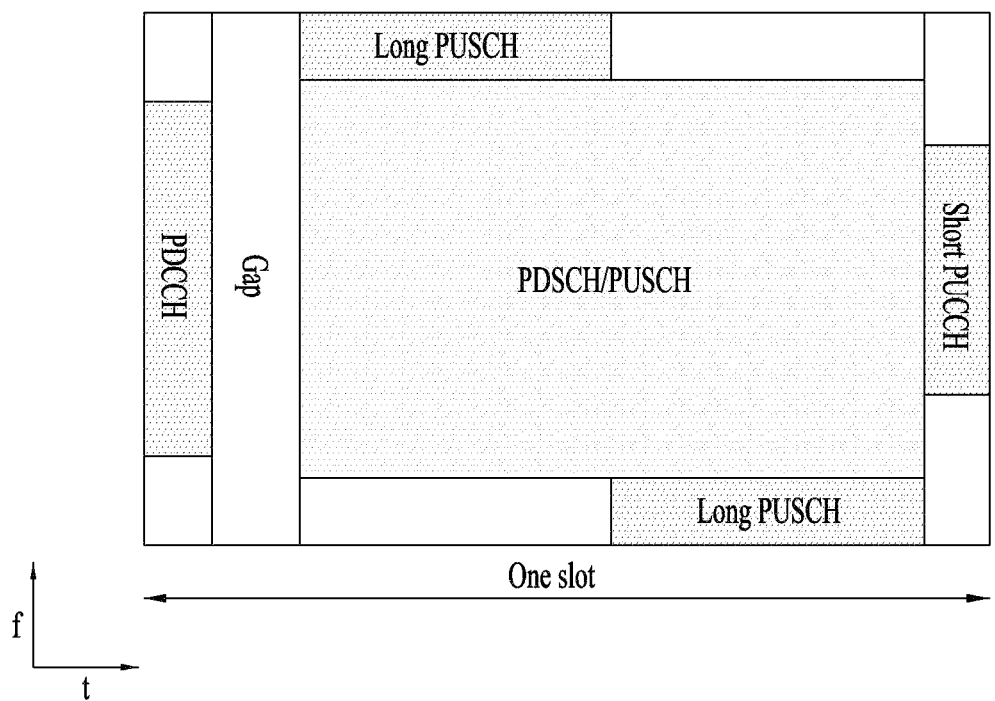
FIG. 5 illustrates mapping of physical channels in a self-contained slot.

1. DL only configuration
2. UL only configuration
3. Mixed UL-DL configuration
   DL region+Guard period (GP)+UL control region
   DL control region+GP+UL region
   DL region: (i) DL data region, (ii) DL control region+ DL data region
   UL region: (i) UL data region, (ii) UL data region+UL control region FIG. 5 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may include 1, 2, 4, 8, or 16 control channel elements (CCEs) depending on the aggregation level (AL). The CCE is a logical allocation unit for providing the PDCCH with a predetermined coding rate based on the state of a radio channel. The PDCCH is transmitted in a control resource set (CORESET). The CORESET is defined as a set of REGs with a given numerology (e.g., SCS, CP length, etc.). A plurality of CORESETs for one UE may overlap in the time/frequency domain. The CORESET may be configured by system information (e.g., master information block (MIB)) or UE-specific higher layer signaling (e.g., radio resource control (RRC) layer signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. Here, monitoring includes (blind) decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher layer signaling. Each CORESET is associated with one or more SSs, and each SS is associated with one CORESET. The SS may be defined based on the following parameters.

controlResourceSetId: this indicates the CORESET related to the SS.
monitoringSlotPeriodicityAndOffset: this indicates a PDCCH monitoring periodicity (on a slot basis) and a PDCCH monitoring period offset (on a slot basis).
monitoringSymbolsWithinSlot: this indicates PDCCH monitoring symbols in a slot (e.g., first symbol(s) in the CORESET).
nrofCandidates: this denotes the number of PDCCH candidates for each AL={1, 2, 4, 8, 16} (one of 0, 1, 2, 3, 4, 5, 6, and 8).
An occasion (e.g., time/frequency resource) for monitoring PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 4-continued

| DCI format | Usage |
| --- | --- |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.
HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.
CSI: feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Seqence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of 1/3. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 6:
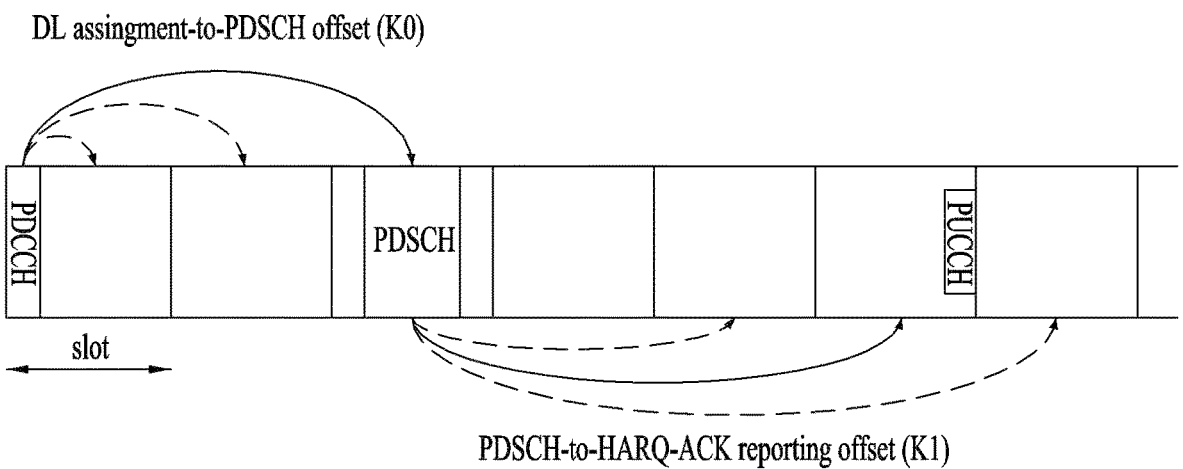
FIG. 6 illustrates an acknowledgment/negative acknowledgment (ACK/NACK) transmission process.

FIG. 6 illustrates an ACK/NACK transmission process. Referring to FIG. 6, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

There are a plurality of parallel DL HARQ processes for DL transmissions in a BS/UE. In the plurality of parallel HARQ processes, DL transmissions are continuously performed, while an HARQ feedback indicating successful or failed reception of a previous DL transmission is awaited. Each DL HARQ process manages state variables related to the transmission number of MAC protocol data units (PDUs) in a buffer, an HARQ feedback for a MAC PDU in the buffer, a current redundancy version, and so on. Each HARQ process is identified by an HARQ process ID.

Figure 7:
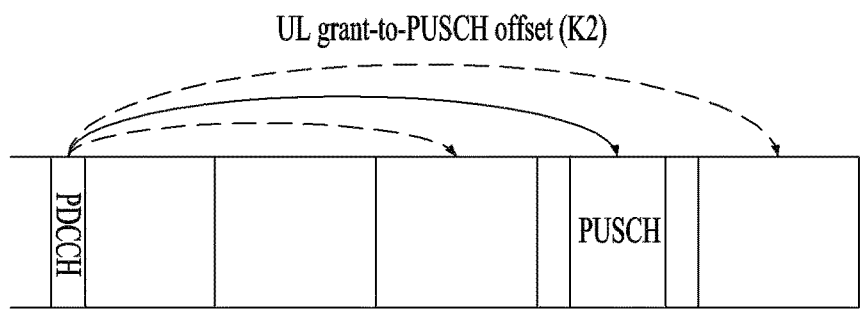
FIG. 7 illustrates a physical uplink shared channel (PUSCH) transmission process.

FIG. 7 illustrates an exemplary PUSCH transmission process. Referring to FIG. 7, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 8:
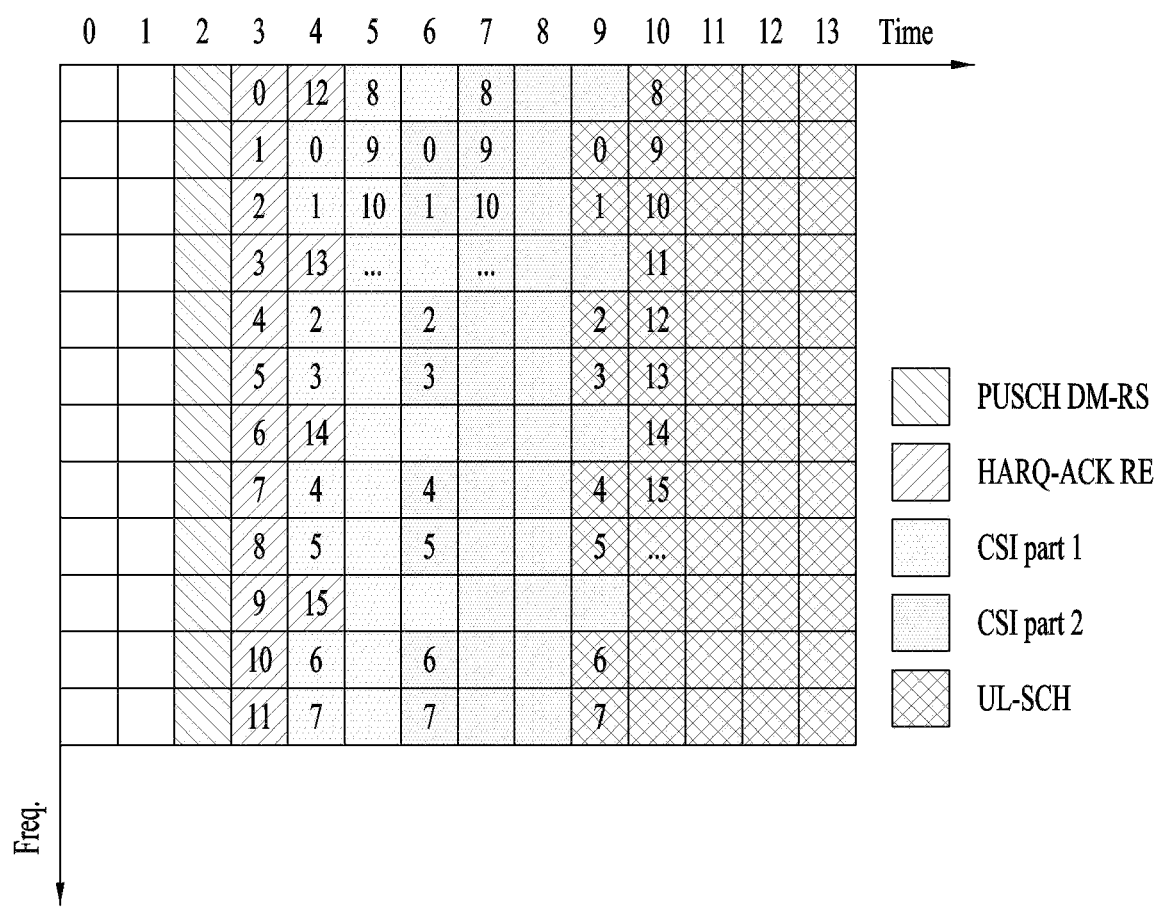
FIG. 8 illustrates multiplexing of control information in a PUSCH.

FIG. 8 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, etc.). In recent years, data traffic has significantly increased with the advent of smart devices. Thus, the 3GPP NR system has also considered the use of an unlicensed band for cellular communication as in License-Assisted Access (LAA) of the legacy 3GPP LTE system. However, unlike the LAA, a NR cell in the unlicensed-band (NR U-cell) aims to support standalone operation. For example, PUCCH, PUSCH, and/or PRACH transmission may be supported in the NR UCell.

FIG. 9 illustrates an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 9 (*a*) shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 9 (*a*) corresponds to the LAA of the 3GPP LTE system. FIG. 9 (*b*) shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in the U-band of the 3GPP NR system.

Figure 10:
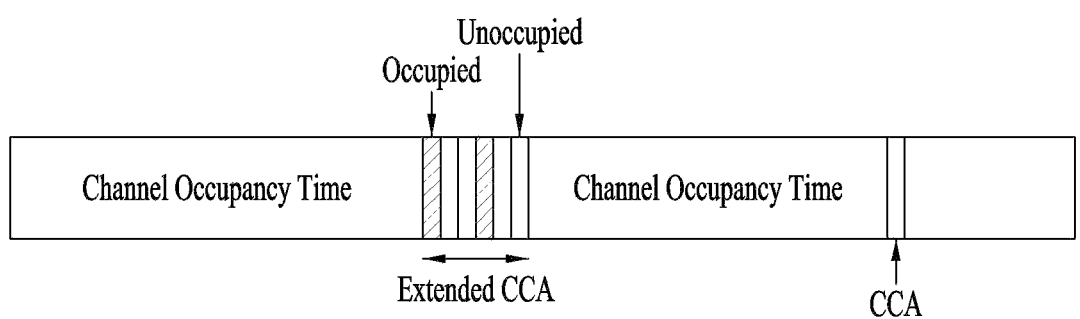
FIG. 10 illustrates an exemplary method of occupying resources in an unlicensed band.

FIG. 10 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to (13/32)q ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32)q ms and transmit data.

Specifically, a plurality of CAP types may be defined for UL transmission in the U-band. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 11:
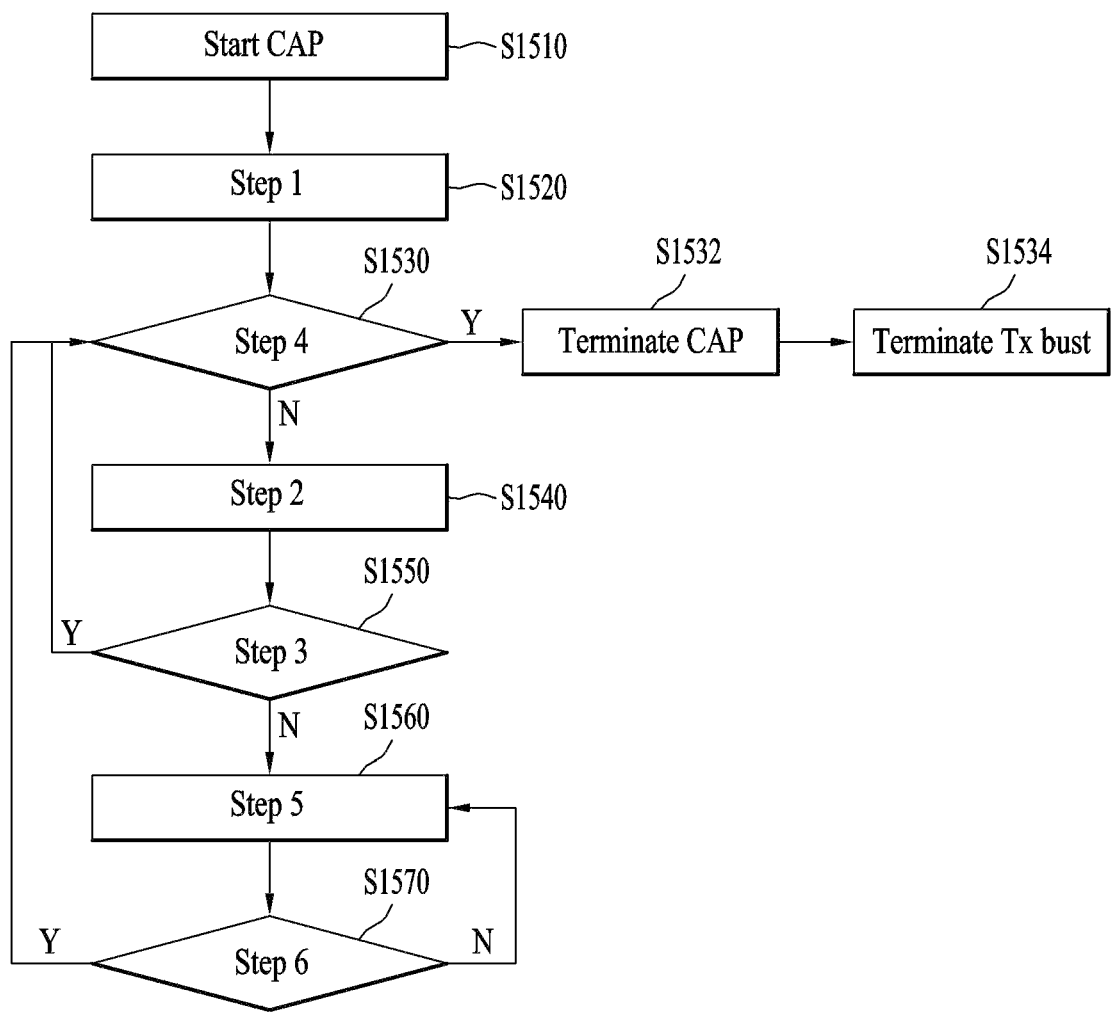
FIG. 11 is a flowchart illustrating a type-1 channel access procedure (CAP) operation for uplink (UL) signal transmission at a user equipment (UE)

FIG. 11 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 6 shows that the values of $m_p$, a minimum CW, a maximum CW, a maximum channel occupancy time (MCOT), and allowed CW sizes, which are applied to the CAP, vary depending on channel access priority classes.

TABLE 6

| Channel Access Priority Class (p) | $m_p$ | $CW_{min,p}$ | $CW_{max,p}$ | $T_{nlmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6 ms or 10 ms | {15,31,63,127,255,511,1023} |
| 4 | 7 | 15 | 1023 | 6 ms or 10 ms | {15,31,63,127,255,511,1023} |

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p∈{1, 2, 3, 4}. Otherwise, the UE may increase $CW_p$ for every priority class p∈{1, 2, 3, 4} to a next higher allowed value.

A reference subframe nm (or reference slot $n_{ref}$) is determined in the following manner.

When the UE receives a UL grant in a subframe (or slot) $n_g$ and transmits a UL-SCH in subframes (or slots) $n_0$, $n_1$, ... $n_w$, starting from the subframe (or slot) no without a gap, the reference subframe (or slot) $n_{ref}$ is the subframe (or slot) no.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

Embodiments: HARQ-ACK Feedback in U-Band

To support a stand-alone operation in a U-band, a UE operation of transmitting an HARQ-ACK feedback based on a U-band PUCCH/PUSCH transmission, in response to a DL data (e.g., PDSCH) reception may be essential (hereinafter, HARQ-ACK is referred to as A/N, for convenience). A PUCCH/PUSCH is a PUCCH or a PUSCH.

The present disclosure proposes a method of transmitting an HARQ-ACK feedback (hereinafter, referred to as A/N) in a U-band. Similarly, the present disclosure may be applied to a method of transmitting other UCI (e.g., CSI or SR) on a PUCCH/PUSCH, not limited to a method of transmitting an HARQ-ACK feedback on a PUCCH/PUSCH. Further, the present disclosure is not limited to an LBT-based U-band operation, and may be applied to an L-band (or U-band) operation without LBT in a similar manner. In the following description, a plurality of CCs (CC indexes) may be replaced with a plurality of BWPs (BWP indexes) configured in one (or more) CC(s)/(serving)cell(s) or a plurality of CCs/(serving)cells including a plurality of BWPs (i.e., CC (index)-BWP (index) combinations).

The terms as used herein are defined as follows.
UCI: Control information that the UE transmits on UL. UCI includes a few types of control information (i.e., UCI types). For example, the UCI includes HARQ-ACK, SR, and CSI.

HARQ-ACK: Indicates whether DL data (e.g., a TB or a codeword (CW)) has been successfully received on a PDSCH. A 1-bit HARQ-ACK may be transmitted in response to a single DL data, and a 2-bit HARQ-ACK may be transmitted in response to two DL data. An HARQ-ACK response/result includes positive ACK (ACK), negative ACK (NACK), discontinuous transmission (DTX), or NACK/DTX. The term HARQ-ACK is interchangeably used with ACK/NACK, A/N, and AN.

HARQ process number/ID: Indicates the number or ID of an HARQ process. The HARQ process manages state variables related to the number of transmissions of MAC PDUs in a buffer, an HARQ feedback for a MAC PDU in the buffer, a current redundancy version, and so on.

PUCCH: A physical-layer UL channel for UCI transmission. For convenience, PUCCH resources configured and/or indicated for A/N, SR, and CSI transmissions by the BS are referred to as A/N PUCCH resources, SR PUCCH resources, and CSI PUCCH resources, respectively.

PUSCH: A physical-layer UL channel for UL data transmission.

Slot: A basic time unit (TU) or time interval for data scheduling. A slot includes a plurality of symbols. A symbol may be an OFDM-based symbol (e.g., CP-OFDM symbol or DFT-s-OFDM symbol). In the present disclosure, the terms symbol, OFDM-based symbol, OFDM symbol, CP-OFDM symbol, and DFT-s-OFDM symbol are interchangeably used.

Unless contradicting each other, each of the proposed methods described below may be applied in combination with any of the other proposed methods.

(1) HARQ-ACK Feedback Configuration/Transmission Method

A/N feedback configuration/transmission methods based on which an A/N (PUCCH/PUSCH) is transmitted, as proposed in the present disclosure, will be described below.

0) A/N Transmission Based on Channel Occupancy Time (COT) Configuration (FIG. 12)

A. Referring to FIG. 12(a), the BS may schedule a PDSCH transmission B to the UE in a COT period P occupied by LBT (CCA) and indicate to the UE to transmit an A/N feedback C for the PDSCH reception B in the same COT period P (or in a BS-initiated COT period starting with/occupied for a DL transmission), as indicated by reference character A (intra-COT A/N transmission). A COT is a channel occupancy time available for signal transmission, when LBT is successful. In intra-COT A/N transmission, a channel may be empty after a DL burst within a COT, which increases an HARQ-ACK transmission probability. Therefore, the UE may perform only 25-usec LBT before the UL transmission C.

B. Referring to FIG. 12(b), because of a UE processing time required for decoding a PDSCH signal and encoding an HARQ-ACK signal corresponding to the PDSCH signal, transmission of an A/N feedback C for reception B of a PDSCH scheduled/transmitted in a COT period P, in another COT period Q (or a period which does not belong to a BS-initiated COT period) following the COT period P may be indicated (inter-COT A/N transmission).

1) Timing-Based A/N Feedback Method (Hereinafter, Referred to as t-A/N Scheme) (FIG. 13)

A. After preconfiguring a plurality of candidate HARQ timings by RRC signaling, the BS may indicate one of the candidate HARQ timings to the UE by (DL grant) DCI. The UE may then operate to transmit A/N feedbacks for receptions of (a plurality of) PDSCHs in a plurality of slots corresponding to the total candidate HARQ timing set at the indicated HARQ timing. An HARQ timing is a PDSCH-to-A/N timing/interval. The HARQ timing may be represented in slots.

For example, when an A/N transmission in slot #m is indicated, A/N information may include response information for reception of a PDSCH in slot #(m-i). Slot #(m-i) is a slot corresponding to a candidate HARQ timing. FIG. 13(a) illustrates a case in which candidate HARQ timings are set to have i={2, 3, 4, 5}. In this case, when an A/N transmission timing is indicated as #(n+5)(=m), the UE may generate/transmit A/N information for PDSCHs received in slots #n to #(n+3) (i.e., A/N feedbacks for all four slots). An A/N response for the PDSCH received in slot #n+1 or slot #(n+3) may be processed as NACK.

B. In addition to an HARQ timing indication, a counter downlink assignment index (c-DAI) and/or a total DAI (t-DAI) may also be signaled by (DL grant) DCI. The c-DAI may indicate the scheduled number of a PDSCH corresponding to the (DL grant) DCI. The t-DAI may indicate the total number of PDSCHs scheduled up to the current slot (or the total number of slots carrying PDSCHs). Accordingly, the UE may operate to transmit A/Ns for PDSCHs corresponding to c-DAI values from an initial c-DAI value to the last (received) t-DAI value at an indicated HARQ timing. When a single serving cell has been configured for the UE, the c-DAI and the t-DAI may have the same meaning. Accordingly, only when there are a plurality of serving cells, the t-DAI may be included in the (DL grant) DCI. When a plurality of serving cells are configured for the UE, the c-DAI may indicate the scheduled number of a PDSCH (or the number of (a serving cell, a slot) carrying the PDSCH), which has first been counted in the cell domain and then in the time domain. Similarly, the t-DAI may indicate the total number of PDSCHs scheduled so far (up to the current slot) (or the total number of (serving cells, slots) carrying PDSCHs). The c-DAI/t-DAI may be defined based on a PDCCH. In this case, a PDSCH may be replaced by a PDCCH, and a slot carrying a PDCCH may be replaced by a PDCCH monitoring occasion in which a PDCCH (or DCI) related to the PDCCH exists, in the above description.

The c-DAI/t-DAI may be indicated in two bits. A number larger than 4 may be indicated by using a modulo operation, as follows.

When the DAI bits are 00 (e.g., DAI value=1), this indicates 4n+1 (i.e., 1, 5, 9, . . . ).

When the DAI bits are 01 (e.g., DAI value=2), this indicates 4n+2 (i.e., 2, 6, 10, . . . ).

When the DAI bits are 10 (e.g., DAI value=3), this indicates 4n+3 (i.e., 3, 7, 11, . . . ).

When the DAI bits are 11 (e.g., DAI value=4), this indicates 4n+4 (i.e., 4, 8, 12, . . . ).

n is an integer equal to or larger than 0.

FIG. 13(b) illustrates a case in which a DAI is signaled by (DL grant) DCI in the same situation as illustrated in FIG. 13(a). Referring to FIG. 13(b), a PDSCH scheduled by DCI with DAI=00 may be received in slot #n, and a PDSCH scheduled by DCI with DAI=10 may be received in slot #(n+2). In this case, the UE may generate/transmit A/N information only for receptions of three PDSCHs corresponding to consecutive DAI values (i.e., DAI=00/01/11) (hereinafter, referred to as a DAI sequence). Herein, an A/N response for the reception of the PDSCH corresponding to DAI=01 may be processed as NACK.

Figure 14:
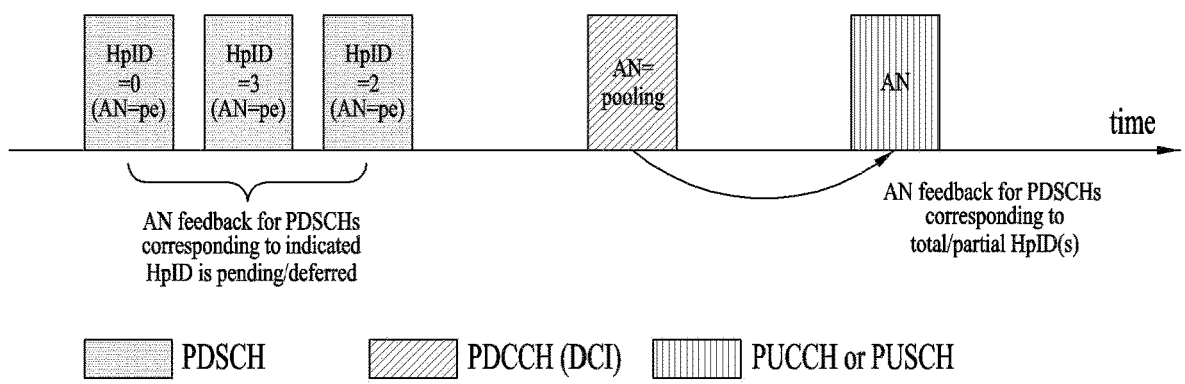

2) Pooling-Based A/N Feedback Method (Hereinafter, Referred to as p-A/N Scheme) (FIG. 14).

A. Pending/deferral of an A/N feedback transmission for a corresponding PDSCH may be indicated by DL grant DCI. Subsequently, transmission of an A/N feedback for a PDSCH corresponding to (i) total DL HARQ process IDs or (ii) some specific DL HARQ process ID(s) may be indicated by DCI (pooling). The A/N feedback may be transmitted at a timing configured/indicated by a specific signal (e.g., RRC signaling or DCI). A/N pooling may be indicated by a DL grant (e.g., DCI format 1_0/1_1), a UL grant (e.g., DCI format 0_0/0_1), or other DCI (e.g., UE(group)-common DCI). For convenience, DCI indicating A/N pooling is referred to as pooling DCI. HARQ process IDs subjected to pooling may be preconfigured/predefined or indicated by pooling DCI. A/N pooling may be indicated for the total HARQ process IDs, each group HARQ process ID, or each individual HARQ process ID.

For example, referring to FIG. 14, the UE may receive, from the BS, three PDSCHs to which HARQ process IDs (HpIDs) 0, 3 and 2 have been assigned respectively. Further, A/N pending (AN=pe) may be indicated for the three PDSCHs by DL grant DCI for each. In this case, the UE defers an A/N transmission for reception of the PDSCHs with HpID=0, 3 and 2. Then, when receiving pooling DCI (AN=pooling) from the BS, the UE may transmit A/Ns for the PDSCHs corresponding to all or a part of the HpIDs at one time.

B. When c-DAI/t-DAI signaling is configured in the t-A/N scheme (e.g., a DAI is signaled by DL grant DCI), A/N pooling may be defined as pooling of an A/N transmission for a PDSCH corresponding to an HARQ process ID (indicated by pooling DCI) or pooling of an A/N transmission for at least one PDSCH corresponding to a t-DAI value (indicated by pooling DCI). In the latter case, the UE may transmit A/N information for reception of PDSCHs corresponding to an initial c-DAI to a t-DAI value at one time.

3) Method of Dynamically Switching Between the t-A/N Scheme and the p-A/N Scheme.

A. For example, switching between the t-A/N scheme and the p-A/N scheme may be indicated by DL grant DCI. That is, which one between the t-A/N scheme and the p-A/N scheme is used to configure/transmit an A/N feedback may be indicated by DL grant DCI. Additionally, even A/N pending or A/N pooling for the p-A/N scheme may be indicated by the same DL grant DCI. For example, when the DL grant DCI indicates the p-A/N scheme, the DL grant DCI may further indicate pending or pooling of an A/N feedback transmission.

B. In another example, switching between the t-A/N scheme and A/N pending for application of the p-A/N scheme may be indicated by DL grant DCI. That is, DL grant DCI may indicate whether to apply the t-A/N scheme or pending of an A/N feedback transmission in the p-A/N scheme. Herein, A/N pooling in the p-A/N scheme may be indicated by UL grant DCI or (UE(group)-)common DCI.

C. In another example, switching between the t-A/N scheme and A/N pending for application of the p-A/N scheme may be indicated by DL grant DCI including PDSCH scheduling. That is, DL grant DCI may indicate whether to apply the t-A/N scheme or pend an A/N transmission in the p-A/N scheme. Herein, A/N pooling in the p-A/N scheme may be indicated by DL grant DCI without PDSCH scheduling.

Figure 15:
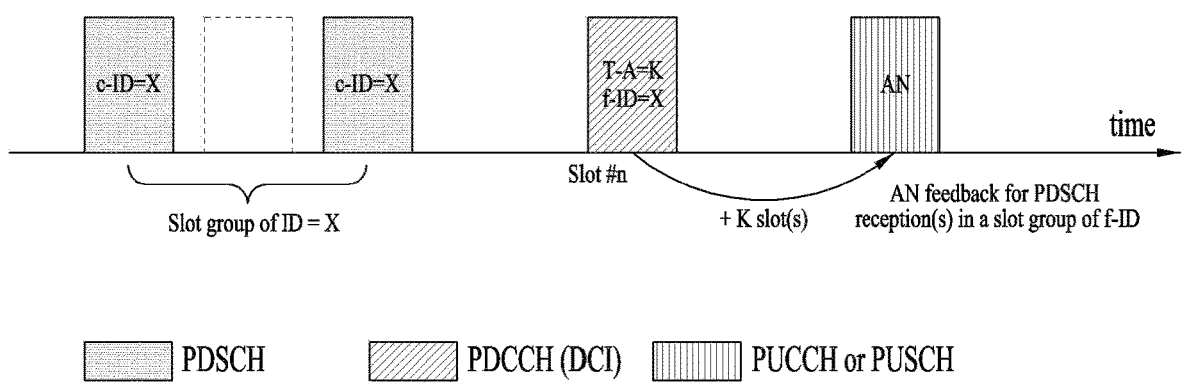

4) PDSCH (Slot) Group ID-Based A/N Feedback Method (FIG. 15)

A. A current-ID (c-ID) identifying a slot group to which a slot carrying DCI grant DCI or a corresponding PDSCH belongs may be signaled by the DCI (i.e., the DCI grant DCI). 1) An actual A/N transmission timing A and 2) a feedback-ID (f-ID) indicating the ID of a (DL PDSCH) slot group for which an A/N feedback is to be transmitted may be signaled by A/N triggering DCI. The slot group may be defined based on a plurality of (e.g., M) candidate timing sets. For example, when a candidate timing set is defined as D_m (m=0, 1, . . . , M−1), a slot group to which slot #n belongs may include M slots corresponding to slot #(n−D_m) or slot #(n+D_m) (m=0, 1, . . . , M). M may be predefined or indicated by the BS.

B. The UE may operate to transmit an A/N feedback for a slot group corresponding to an f-D (a c-ID signaled/received as a value identical to the f-D) (an A/N feedback for reception of a PDSCH in the slot group) at a time indicated as an A/N transmission timing. For example, referring to FIG. 15, A/N triggering DCI (or when the DCI is DL grant DCI, a PDSCH corresponding to the DL grant DCI) may be transmitted/detected in slot #n, indicating K and X where K is timing-A (T-A) and X is an f-D. The UE may then transmit an A/N feedback for a PDSCH reception in a slot group corresponding to the slot group ID, X (i.e., a c-ID set to X in the DL grant DCI) in slot #(n+K). When the UE transmits the A/N feedback for the slot group corresponding to the f-D (e.g., slot group ID=X) at a time (e.g., slot #K1) indicated as a first A/N transmission timing, a PDSCH related to a second A/N transmission timing (e.g., slot #K2) may be received in the slot group corresponding to the f-ID. In this case, the A/N response for the PDSCH reception may be set to NACK in the A/N feedback transmitted in slot #K1.

C. When A/N triggering DCI is identical to DL grant DCI (i.e., both a c-ID and an f-ID are signaled by DL grant DCI), the UE may operate to transmit 1) an A/N feedback for a bundling window corresponding to a T-A or a slot group (for a PDSCH reception) corresponding to the c-ID and 2) an A/N feedback for a slot group (for a PDSCH reception) corresponding to the f-ID, in combination (e.g., in concatenation) (simultaneously, for example, on one PUCCH/PUSCH), at a timing indicated by the T-A.

One CC or BWP configured for the UE in the U-band situation may be a wideband having a larger BW than in legacy LTE. However, even in this wideband CC/BWP configuration situation, a BW requiring CCA based on an independent LBT operation may be limited (according to a specific rule). Accordingly, a unit subband in which LBT is performed individually is defined as an LBT-SB. A plurality of LBT-SBs may be included (contiguously or non-contiguously) in one wideband CC/BWP. Based on this configuration, a plurality of candidate PUCCH resources in time and/or frequency may be indicated/configured (by RRC signaling and/or DCI) in consideration of LBT failure for an A/N PUCCH (and the resulting dropping of the A/N PUCCH transmission) in the U-band situation. The UE may transmit the A/N PUCCH in a specific (one) resource in which LBT is successful among the plurality of candidate PUCCH resources.

Specifically, a plurality of TDMed candidate PUCCH resources (e.g., a slot or symbol group) (contiguous or non-contiguous) in time may be indicated/configured for transmission of a single A/N PUCCH. These candidate PUCCH resources may be referred to as candidate T-domain resources. The UE may attempt LBT in the plurality of (time) resources sequentially in time, and transmit the A/N PUCCH in a specific resource in which CCA is successful (for the first time). Further, a plurality of candidate PUCCH resources (e.g., LBT-SBs, BWPs, or CCs) distinguished by frequency may be indicated/configured for transmission of a single A/N PUCCH. These candidate PUCCH resources may be referred to as candidate F-domain resources. The UE may attempt LBT in the plurality of (frequency) resources (at the same time), and transmit the A/N PUCCH in a specific resource in which CCA is successful.

(2) UL TX Parameter Configuration for A/N Transmission (1) Intra-COT A/N transmission or the t-A/N scheme or (2) inter-COT A/N transmission or the p-A/N scheme may be indicated by A/N triggering DCI. Accordingly, all or a part of the following UL TX parameters may be configured differently. An A/N transmission may be triggered by DL grant DCI, UL grant DCI, or common DCI.

1) Candidate HARQ Timing Set

A. When the p-A/N scheme is indicated, a minimum candidate HARQ timing may be set to a larger value, and/or the interval between adjacent candidate HARQ timings may be configured/set to be larger than when the t-A/N scheme is indicated.

2) Candidate PUCCH Starting Symbol Set or Candidate PUCCH Resource Set

A. When the p-A/N scheme is indicated, a larger number of candidate PUCCH starting symbols (or candidate PUCCH resources) may be configured than when the t-A/N scheme is indicated. For example, in the case of the p-A/N scheme, a plurality of candidate PUCCH starting symbols (or candidate PUCCH resources) may be configured, whereas in the case of the t-A/N scheme, a single PUCCH starting symbol (or PUCCH resource) may be configured. That is, more LBT opportunities may be provided for the p-A/N scheme.

3) LBT Type

A. When the p-A/N scheme is indicated, a contention window size (CWS) for back-off (BO)-based LBT may be set to a larger value than when the t-A/N scheme is indicated. For example, in the case of the p-A/N scheme, a CWS-based BO-based LBT type (e.g., Cat-4 LBT) may be configured. On the other hand, in the case of the t-A/N scheme, a BO-less LBT type may be configured. For example, in the case of the t-A/N scheme, no LBT (i.e., a UL transmission without LBT) or Cat-2 LBT (based on a short CCA gap of 25 us) may be configured.

4) A/N PUCCH Resource Set

A. When the p-A/N scheme is indicated, PUCCH resources/formats with a larger maximum supported UCI payload size may be configured/set, and PUCCH resources/formats with a larger symbol period may be configured/set than when the t-A/N scheme is indicated.

B. In addition, when the p-A/N scheme is indicated, PUCCH resources may be configured only in the form of an RB set discontinuous (e.g., in an equi-distant interlaced structure) in frequency. When the t-A/N scheme is indicated, PUCCH resources may also be configured in the form of a continuous RB set (in addition to an RB interlaced form).

C. For the above PUCCH resource allocation, each state indicated by a PUCCH resource indicator (PRI) field in DL grant DCI may be set to a different PUCCH resource structure. For example, a specific state may be set to an interlaced RB set, and another state may be set to a continuous RB set. Thus, a PUCCH resource structure may be dynamically indicated/changed by the PRI field.

5) A/N Feedback Type

A. When inter-COT A/N transmission is indicated, the p-A/N scheme may be applied, and when intra-COT A/N transmission is indicated, the t-A/N scheme may be applied.

In another method, a small CWS-based or BO-less type LBT operation is defined as LBT type A (e.g., no LBT or Cat-2 LBT), and a large CWS-based or BO-based LBT operation may be defined as LBT type B (e.g., Cat-4 LBT). In this case, when LBT type A is indicated by A/N triggering DCI, {t-A/N feedback type, candidate HARQ timing set, candidate PUCCH starting symbol set, A/N PUCCH resource set} corresponding to/configured for intra-COT A/N transmission may be applied. When LBT type B is indicated, {p-A/N feedback type, candidate HARQ timing set, candidate PUCCH starting symbol set, A/N PUCCH resource set} corresponding to/configured for inter-COT A/N transmission may be applied. Alternatively, when no LBT (hereinafter, LBT type X) is indicated by AN triggering DCI, {t-A/N feedback type, candidate HARQ timing set, candidate PUCCH starting symbol set, A/N PUCCH resource set} corresponding to/configured for intra-COT A/N transmission may be applied. When Cat-2 or Cat-4 LBT (hereinafter, LBT type Y) is indicated, (p-A/N feedback type, candidate HARQ timing set, candidate PUCCH starting symbol set, A/N PUCCH resource set) corresponding to/configured for inter-COT A/N transmission may be applied.

In another aspect, all or a part of the following UL TX parameters may be configured differently depending on whether 1) LBT type A (or LBT type X) or 2) LBT type B (or LBT type Y) is indicated by A/N triggering DCI. In the following description, LBT type A may mean LBT type A or X, and LBT type B may mean LBT type B or Y. An A/N transmission may be triggered by DL grant DCI, UL grant DCI, or common DCI.

1) Candidate HARQ Timing Set

A. When LBT type B is indicated, a minimum candidate HARQ timing may be set to a larger value, and/or the interval between adjacent candidate HARQ timings may be configured/set to be larger than when LBT type A is indicated.

2) Candidate PUCCH Starting Symbol Set or Candidate PUCCH Resource Set

A. When LBT type B is indicated, a larger number of candidate PUCCH starting symbols (or candidate PUCCH resources) may be set than when LBT type A is indicated. For example, in the case of LBT type B, a plurality of starting symbols (or candidate PUCCH resources) may be set, whereas in the case of LBT type A, a single starting symbol (or PUCCH resource) may be set. That is, more LBT opportunities may be provided for LBT type B.

3) A/N Feedback Type

A. When LBT type B is indicated, the p-A/N feedback scheme (or inter-COT A/N transmission) may be applied. When LBT type A is indicated, the t-A/N feedback scheme (or intra-COT A/N transmission) may be applied.

4) A/N PUCCH Resource Set

A. When LBT type B is indicated, PUCCH resources/formats with a larger maximum supported UCI payload size may be configured/set, and PUCCH resources/formats with a larger symbol period may be configured/set than when LBT type A is indicated.

B. In addition, when LBT type B is indicated, PUCCH resources may be configured only in the form of an RB set discontinuous (e.g., in an equi-distant interlaced structure) in frequency. When LBT type A is indicated, PUCCH resources may also be configured in the form of a continuous RB set (in addition to an RB interlaced form).

C. For the above PUCCH resource allocation, each state indicated by a PRI field in DL grant DCI may be set to a different PUCCH resource structure. For example, a specific state may be set to the interlaced RB set, and another state may be set to the continuous RB set. Thus, a PUCCH resource structure may be dynamically indicated/changed by the PRI field.

(3) UL TX Parameter Configuration for PUSCH Transmission

As an example of UL data (e.g., PUSCH) scheduling/transmission, a process of transmitting UL grant DCI that schedules a PUSCH for the UE in a COT period occupied by LBT and indicating to the UE to transmit a PUSCH in the same COT period (or a BS-initiated COT period starting with/occupied by a DL transmission) may be considered (intra-COT PUSCH transmission). As another example, a process of indicating transmission of a PUSCH corresponding to UL grant DCI transmitted in a specific COT period, in another COT period (or a period which does not belong to a BS-initiated COT period) following the COT period because of a UE processing time required for decoding a UL grant DCI signal and encoding a corresponding PUSCH signal may be considered (inter-COT PUSCH transmission).

In this situation, according to whether 1) intra-COT PUSCH transmission (for convenience, referred to as intra-COT) or 2) inter-COT PUSCH transmission (for convenience, referred to as inter-COT) is indicated by UL grant DCI, all or part of the following UL TX parameters may be configured differently.

1) Candidate HARQ (DCI-to-PUSCH) Timing Set

A. When inter-COT is indicated, a minimum candidate HARQ timing may be set to a larger value, and/or the interval between adjacent candidate HARQ timings may be configured/set to be larger than when intra-COT is indicated.

2) Candidate PUSCH Starting Symbol Set or Candidate PUSCH Resource Set

A. When inter-COT is indicated, a larger number of candidate PUSCH starting symbols (or candidate PUSCH resources) may be set than when intra-COT is indicated. For example, in the case of inter-COT, a plurality of candidate PUSCH starting symbols (or candidate PUSCH resources) may be configured, whereas in the case of intra-COT, a single PUSCH starting symbol (or PUSCH resource) may be configured. That is, more LBT opportunities may be provided for inter-COT.

3) LBT Type

A. When inter-COT is indicated, a CWS for BO-based LBT may be set to a larger value than when the intra-COT is indicated. For example, in the case of the inter-COT, a CWS-based BO-based LBT type (e.g., Cat-4 LBT) may be configured. On the other hand, in the case of intra-COT, a BO-less LBT type may be configured. For example, in the case of intra-COT, no LBT (i.e., a UL transmission without LBT) or Cat-2 LBT (based on a short CCA gap of 25 us) may be configured.

4) PUSCH Resource Allocation

A. When inter-COT is indicated, a larger (maximum) PUSCH symbol period may be configured/allocated on the time axis, and a smaller (minimum) PUSCH resource size may be configured/allocated on the frequency axis than when intra-COT is indicated.

B. In addition, when inter-COT is indicated, PUSCH resources may be configured only in the form of an RB set discontinuous (e.g., in an equi-distant interlaced structure) in frequency. When intra-COT is indicated, PUSCH resources may also be configured in the form of a continuous RB set (in addition to an RB interlaced form).

In another method, a small CWS-based or BO-less type LBT operation is defined as LBT type A (e.g., no LBT or Cat-2 LBT), and a large CWS-based or BO-based LBT operation may be defined as LBT type B (e.g., Cat-4 LBT). In this case, when LBT type A is indicated by UL grant DCI, (candidate HARQ timing set, candidate PUSCH starting symbol set, PUSCH resource allocation) corresponding to/configured for intra-COT PUSCH transmission may be applied. When LBT type B is indicated, (candidate HARQ timing set, candidate PUSCH starting symbol set, PUSCH resource allocation) corresponding to/configured for inter-COT PUSCH transmission may be applied. Alternatively, when no LBT (hereinafter, LBT type X) is indicated by UL grant DCI, (candidate HARQ timing set, candidate PUSCH starting symbol set, PUSCH resource allocation) corresponding to/configured for intra-COT PUSCH transmission may be applied. When Cat-2 or Cat-4 LBT (hereinafter, LBT type Y) is indicated, (candidate HARQ timing set, candidate PUSCH starting symbol set, PUSCH resource allocation) corresponding to/configured for inter-COT PUSCH transmission may be applied.

In another aspect, all or a part of the following UL TX parameters may be configured differently depending on whether 1) LBT type A (or LBT type X) or 2) LBT type B (or LBT type Y) is indicated by UL grant DCI. In the following description, LBT type A may mean LBT type A or X, and LBT type B may mean LBT type B or Y.

1) Candidate HARQ (DCI-to-PUSCH) Timing Set

A. When LBT type B is indicated, a minimum candidate HARQ timing may be set to a larger value, and/or the interval between adjacent candidate HARQ timings may be configured/set to be larger than when LBT type A is indicated.

2) Candidate PUSCH Starting Symbol Set or Candidate PUSCH Resource Set

A. When LBT type B is indicated, a larger number of candidate PUSCH starting symbols (or candidate PUSCH resources) may be configured than when LBT type A is indicated. For example, in the case of LBT type B, a plurality of starting symbols (or candidate PUSCH resources) may be configured, whereas in the case of LBT type A, a single starting symbol (or PUSCH resource) may A be configured. That is, more LBT opportunities may be provided for LBT type B.

3) PUSCH TX Types

A. When LBT type B is indicated, the inter-COT PUSCH transmission scheme may be applied. When LBT type A is indicated, the intra-COT PUSCH transmission scheme may be applied.

4) PUSCH Resource Allocation

A. When LBT type B is indicated, a larger (maximum) PUSCH symbol period may be configured/allocated on the time axis, and a smaller (minimum) PUSCH resource size may be configured/allocated on the frequency axis than when LBT type A is indicated.

B. Additionally, when LBT type B is indicated, PUSCH resources may be configured only in the form of an RB set discontinuous (e.g., in an equi-distant interlaced structure) in frequency. When LBT type A is indicated, PUSCH resources may also be configured in the form of a continuous RB set (in addition to an RB interlaced form).

In another method, the following method of indicating a PUSCH transmission timing and transmitting a PUSCH may be considered. A field in a PDCCH/PDSCH, indicating a UL grant (DCI)-to-PUSCH transmission (HARQ) timing is defined as a UL HARQ timing indicator (U-HTI) field, for convenience.

1) For each state of the U-HTI, a candidate PUSCH timing set including (the same number of) multiple candidate PUSCH timings (e.g., candidate PUSCH starting symbol timings) may be configured.

A. In this case, one specific (e.g., reference) U-HTI state may include minimum timings (e.g., {D1, D2, D3, D4}), and each of the other U-HTI states may be configured by adding the same offset value to the minimum timings (e.g. {D1+a, D2+a, D3+a, D4+a}). Different offset values may be set between different states. An offset may be defined in slots or symbols. Each of the plurality of minimum timings (e.g., {D1, D2, D3, D4}) may indicate different (contiguous) slots, or a plurality of different symbol timings in each of one or more (contiguous) slots.

2) A different number of candidate PUSCH timings (within the timing set configured for each U-HTI state) may be applied according to an LBT type indicated/configured for a PUSCH transmission.

A. For LBT type B or Y, all of a plurality of candidate PUSCH timings included in a candidate PUSCH timing set may be applied. On the other hand, for LBT type A or X, only some (e.g., one) of candidate PUSCH timings in a specific (e.g., earliest) candidate PUSCH timing set may be applied.

(5) Overlap Between A/N Feedback and (PUCCH) Transmission

The UE may be indicated to transmit an A/N for the same one PDSCH (at different time points) based on both of the t-A/N scheme and the p-A/N scheme. In this case, the UE may transmit the A/N for the PDSCH 1) based on the two A/N schemes, 2) only at a time when LBT is first successful in either of the two A/N schemes, or 3) only in the p-A/N scheme. Further, the A/N transmission timings of two A/N (e.g., p-A/N) feedbacks triggered at different time points may overlap with each other (due to failure of LBT for the earlier triggered A/N feedback transmission). In this case, (with respect to the overlapped time point,) the UE may transmit 1) the later (or earlier) triggered A/N (e.g., p-A/N) feedback, or 2) an A/N (e.g., p-A/N) feedback corresponding to more (CCs and/or) HARQ process IDs or a larger total-DAI value.

When an A/N feedback operation (e.g., dynamic switching between the t-A/N scheme and the p-A/N scheme) is applied based on DAI signaling, a mismatch may occur between the BS and the UE, regarding a correct A/N feedback transmission/reception time in a state where the DAI signaling (e.g., by a modulo operation) is performed in a limited number of bits.

Figure 16:
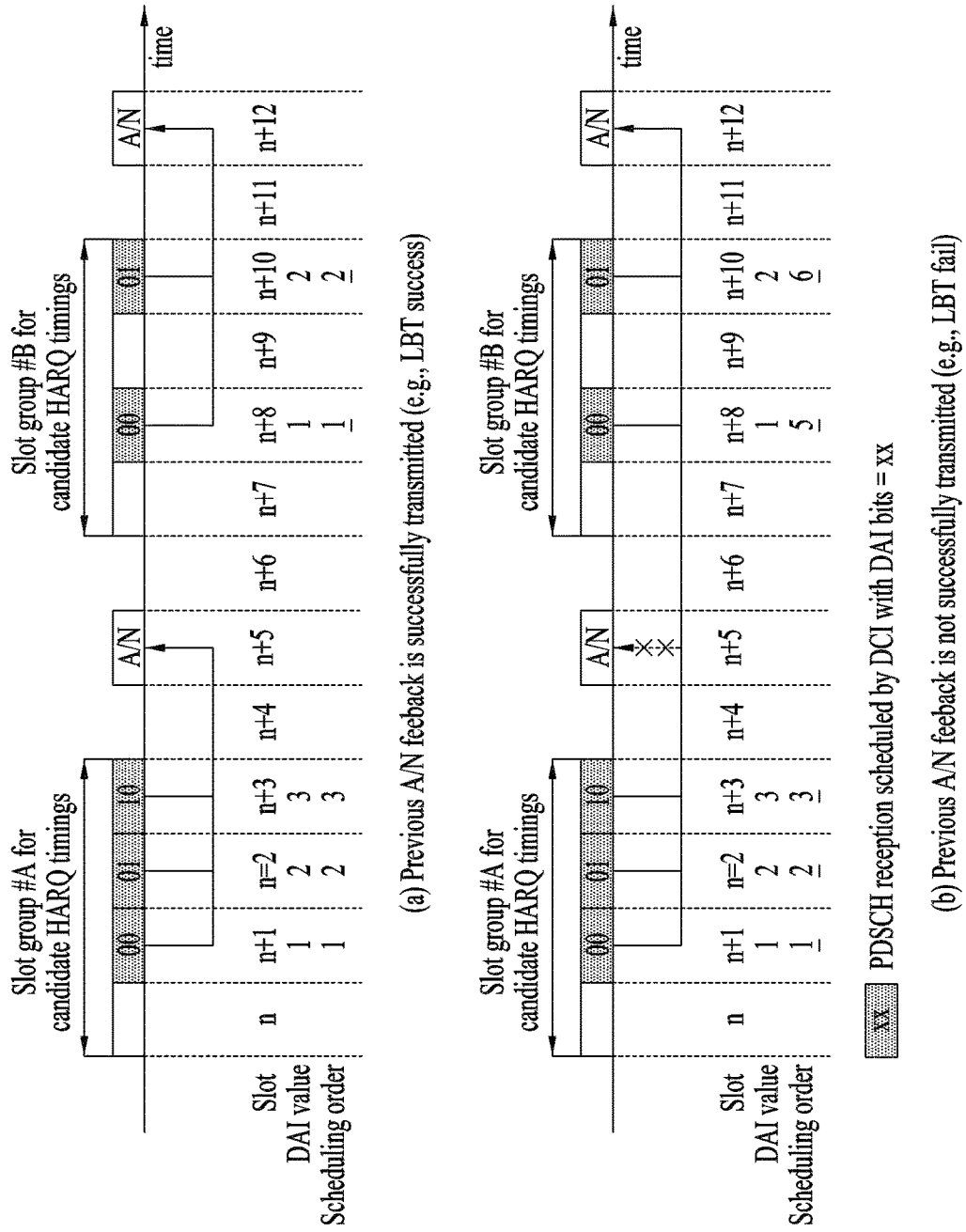

FIG. 16 illustrates an A/N mismatch in a DAI-based A/N feedback process.

For the operation of FIG. 16, the t-A/N scheme of FIG. 13 may be referred to. For example, the BS may preconfigure a plurality of candidate HARQ timings by RRC signaling and then indicate one of the candidate HARQ timings to the UE by (DL grant DCI). Accordingly, when an A/N transmission in slot #m is indicated, A/N information may include response information for a PDSCH reception in slot #(m-i). Slot #(m-i) corresponds to a candidate HARQ timing. FIG. 16 illustrates candidate HARQ timings with i={2, 3, 4, 5}. (DL grant) DCI may signal a DAI together with an HARQ timing indicator. The DAI may represent a modulo value of a scheduling order. For example, it is assumed that the DAI is m-bit (e.g., 2-bit) information ranging from 1 to $2^m$, and the scheduling order starts from 1. In this case, the DAI value may correspond to [scheduling order mod $2^m$].

When the DAI bits are 00 (e.g., DAI value=1), this indicates 4n+1 (i.e., 1, 5, 9, ... ).
When the DAI bits are 01 (e.g., DAI value=2), this indicates 4n+2 (i.e., 2, 6, 10, ... ).
When the DAI bits are 10 (e.g., DAI value=3), this indicates 4n+3 (i.e., 3, 7, 11, ... ).
When the DAI bits are 11 (e.g., DAI value=4), this indicates 4n+4 (i.e., 4, 8, 12, ... ).
n is an integer equal to or larger than 0.
On the assumption that the DAI has a value ranging from 0 to $2^m-1$, the DAI value may be represented as [(scheduling order mod $2^m$)-1]

The DAI may specify the scheduling order of a PDSCH or the scheduling order of a PDCCH/DCI. Further, the DAI may include a c-DAI and/or a t-DAI.

FIG. 16(a) illustrates successful transmission of an A/N feedback for slot group #A at a UE (e.g., LBT success). An A/N feedback in slot #(n+5) is generated based on a DAI sequence (i.e., DAI=1/2/3) (slot #n+1/#n+2/#n+3). Subsequently, the UE may be requested to transmit a new A/N feedback in slot #(n+12). In this case, the UE may generate an A/N feedback based on a DAI sequence (i.e., DAI=1/2) (slot group #A; slot #n+8/#n+10) starting after transmission of the previous A/N feedback. For example, A/N information/bits may be arranged in an A/N feedback according to the sequence of DAI values. Further, the size of the A/N feedback may be determined based on the last value of a scheduled DAI or the number of candidate HARQ timings. The A/N feedback includes A/N payload or an A/N codebook.

FIG. 16(b) illustrates failure of an A/N feedback transmission for slot group #A at a UE (e.g., LBT failure). An A/N feedback in slot #(n+5) may be retransmitted in a next A/N transmission opportunity. For example, when an A/N feedback transmission in slot #(n+12) is requested, the UE may generate an A/N feedback based on a DAI sequence (i.e., DAI=1/2/3/4/1/2) starting from a time point (e.g., slot group #A) corresponding to the previous A/N feedback. Because of the absence of a PDSCH reception corresponding to DAI=4, the UE may set an A/N corresponding to DAI=4 as NACK in the A/N feedback in slot #(n+12).

In the U-band, an A/N feedback may be failed for various reasons in view of the nature of the unlicensed band. For example, as illustrated in FIG. 16, the UE may drop/defer an A/N feedback due to LBT failure. Moreover, although the UE has succeeded in transmitting an A/N feedback after LBT success, the BS may fail in receiving/detecting the A/N feedback. Therefore, there may be ambiguity (between the UE and the BS) about a time from which a set of DAI values (e.g., a DAI sequence) corresponding to an indicated A/N feedback starts, thereby causing a mismatch in A/N codebook configuration/size between the UE and the BS.

To avert the above problem, a method of including an indicator (a DAI sequence flag (DSF)) in DL grant DCI that schedules a PDSCH and/or DCI that triggers an A/N transmission (based on a p-A/N feedback) may be considered. The DSF may be used to indicate a DAI sequence to which a DAI corresponding to a current scheduled/transmitted PDSCH and/or a DAI for a current triggered A/N feedback belongs. The DSF may be configured in one bit. In this case, the DSF may indicate whether the DAI corresponding to the current scheduled/transmitted PDSCH and/or the DAI for the current triggered A/N feedback belongs to a DAI sequence "0" or "1". When the DSF is configured in one bit, the DSF may be signaled in a toggled form. For example, when a DSF value toggled from a DSF value received in previous (recent) DCI is indicated by current DCI, the DAI sequence "0" may be indicated. On the other hand, when a non-toggled DSF value from the DSF value received in the previous (recent) DCI is indicated by the current DCI, the DAI sequence "1" may be indicated. The DAI sequence "0" may correspond to the DAI sequence (i.e., DAI=1/2) of FIG. 16(a) (see slot group #A; slot #n+8/#n+10), and the DAI sequence "1" may correspond to the DAI sequence (i.e., DAI=1/2/3/4/1/2) of FIG. 16(b) (see slot group #A/#B).

Figure 17:
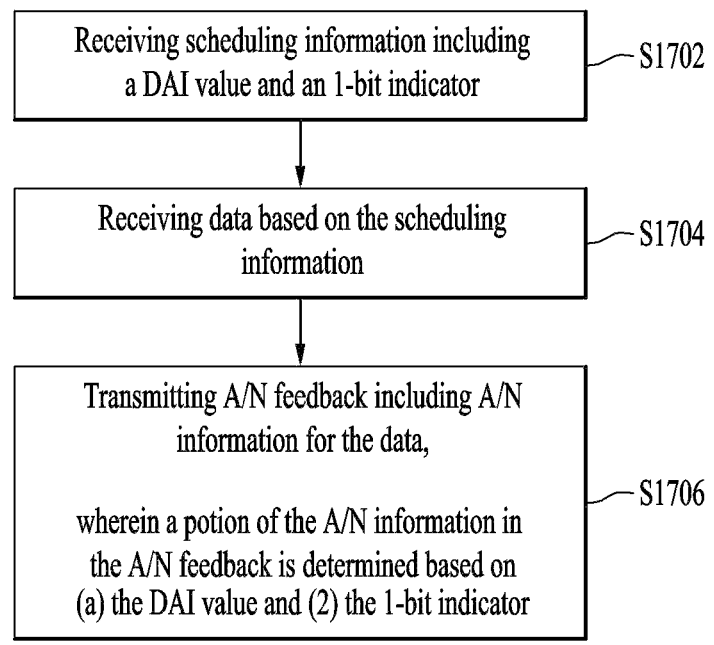

FIG. 17 illustrates an A/N feedback process according to the present disclosure. Referring to FIG. 17, the UE may receive scheduling information including a DAI value and a 1-bit indicator (S1702). The DAI value may represent a modulo value of a scheduling order. For example, the DAI value may be given as [scheduling order mod 4]. The scheduling order may be the scheduling order of a PDSCH or the scheduling order of a PDCCH/DCI. The UE may then receive data based on the scheduling information (S1704). Subsequently, the UE may transmit an A/N feedback including A/N information for the data (S1706). The A/N feedback includes A/N payload or an A/N codebook. The A/N feedback may be transmitted on a PUCCH or a PUSCH.

The position of the A/N information in the A/N feedback may be determined based on (1) the DAI value and (2) whether the bit value of the 1-bit indicator has been toggled. For example, the A/N feedback is configured based on one of two DAI sequences, which is determined according to the bit value of the 1-bit indicator or whether the bit value of the 1-bit indicator has been toggled, and the DAI value may indicate a scheduling order based on the determined DAI sequence. For example, the A/N information/bit may be arranged in the A/N feedback according to the order of the DAI value. The size of the A/N feedback may be determined based on the last value of the scheduled DAI or the number of candidate HARQ timings.

One of the two DAI sequences, a first DAI sequence may correspond to a 1-bit indicator having a bit value of 'a' or a toggled value, and include a first number of DAI values. On the other hand, the other DAI sequence, a second DAI sequence may correspond to a 1-bit indicator having a bit value of 'b' or a non-toggled value, and include a second number of DAI values. The first number may be smaller than the second number. Herein, (a, b) may be (0, 1) or (1, 0).

The DAI may indicate the scheduling order of the data within a time window. In this case, the first DAI sequence between the two DAI sequences may correspond to the 1-bit indicator having a bit value of 'a' or a toggled value, and may correspond to a time window starting from a first time point. On the other hand, the second DAI sequence may correspond to the 1-bit indicator having a bit value of 'b' or a non-toggled value, and may correspond to a time window starting from a second time point. The first time point may be later than the second time point. Herein, (a, b) may be (0, 1) or (1, 0).

Based on the 1-bit indicator indicating a bit value 'a' or having been toggled, the DAI value may indicate the scheduling order of only data after the previous A/N feedback. On the other hand, based on the 1-bit indicator indicating a bit value 'b' or having not been toggled, the DAI value may indicate the scheduling order of (i) data related to the previous A/N feedback, and (ii) the data after the A/N feedback. Herein, (a, b) may be (0, 1) or (1, 0).

Based on the 1-bit indicator indicating a bit value 'a' or having been toggled, the A/N feedback may indicate only a data reception state after the previous A/N feedback. On the other hand, based on the 1-bit indicator indicating a bit value 'b' or having not been toggled, the A/N feedback may indicate (i) the previous A/N feedback and (ii) the data reception state after the A/N feedback. Herein, (a, b) may be (0, 1) or (1, 0).

The transmission of the A/N feedback may be performed according to an LBT result.

Figure 18:
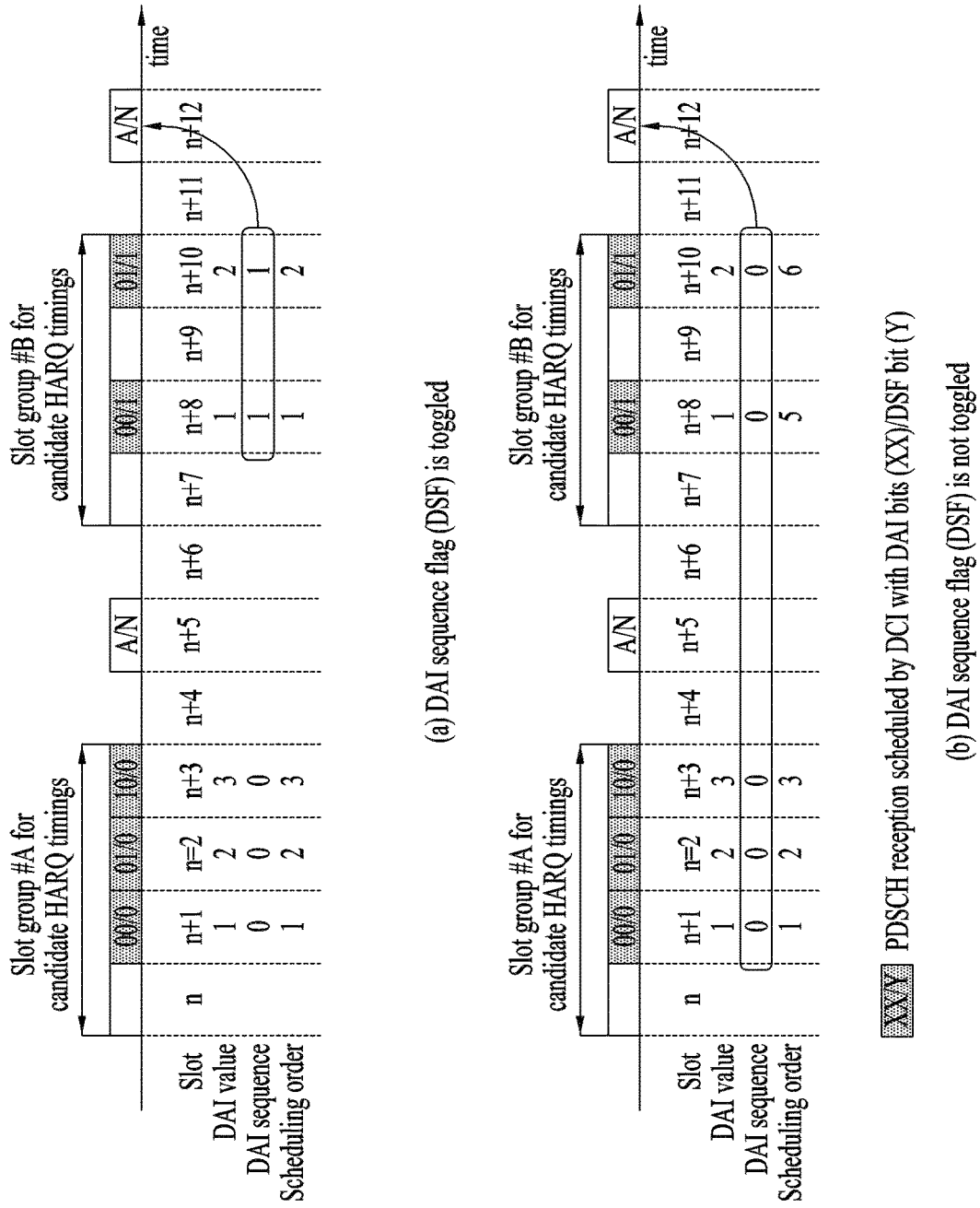

FIG. 18 illustrates an A/N feedback according to the present disclosure. The basic situation is the same as in FIG. 16. Accordingly, the description of FIG. 16 may be referred to for basics.

Referring to FIG. 18(a), the UE may receive a PDSCH in slot #(n+8)/#(n+10). The PDSCH of slot #(n+8) is scheduled by DCI having a first DAI of 00 and a first DSF of 1, and the PDSCH of slot #(n+10) may be scheduled by DCI with a second DAI of 01 and a second DSF of 1. Since the value of the first DSF has been toggled from the DSF value of the previous DCI (e.g., DCI scheduling the PDSCH of slot #(n+3)), the first DAI belongs to a DAI sequence different from the previous DAI sequence. For example, the first DAI may belong to a DAI sequence (e.g., the DAI sequence of 1) starting in slot group #B. In addition, since the value of the second DSF of 1 has not been toggled from the value of the first DSF, the second DAI belongs to the same DAI sequence as the previous DAI sequence (i.e., the DAI sequence 1). Thereafter, the UE may transmit an A/N feedback generated based on the DAI sequence 1 in slot #(n+12). Specifically, the UE may generate the A/N feedback based on the DAI sequence starting after transmission of the previous A/N feedback (i.e., DAI=1/2) (see slot group #A; slot #n+8/#n+10). When the bit value of the DSF indicates a DAI sequence (not shown), the values of DSFs may be given as [a, a, a, b, b] instead of [0, 0, 0, 1, 1] in the example of FIG. 18(a). Herein, a and b may be 0 and 1 or 1 and 0, respectively.

Referring to FIG. 18(b), the UE may receive a PDSCH in slot #(n+8)/#(n+10). The PDSCH of slot #(n+8) is scheduled by DCI having a first DAI of 00 and a first DSF of 0, and the PDSCH of slot #(n+10) is scheduled by DCI having a second DAI of 01 and a second DSF of 0. The first DAI belongs to the same DAI sequence as the previous DAI sequence because the value of the first DSF has not been toggled from the DSF value of the previous DCI (e.g., DCI scheduling the PDSCH of slot #(n+3)). For example, the first DAI may belong to a DAI sequence (e.g., DAI sequence 0) starting in slot group #A. In addition, since the value of the second DSF of 1 has not been toggled from the value of the first DSF, the second DAI belongs to the same DAI sequence as the previous DAI sequence (i.e., DAI sequence 0). Then, the UE may transmit the A/N feedback generated based on the DAI sequence 0 in slot #(n+12). Specifically, the UE may generate the A/N feedback based on a DAI sequence (i.e., DAI=1/2/3/4/1/2) starting from a time point corresponding to the previous A/N feedback (e.g., slot group #A). Since there is no PDSCH reception corresponding to DAI=4, the UE may set the A/N corresponding to DAI=4 as NACK (or DTX) in the A/N feedback of slot #(n+10). When the bit value of the DSF indicates a DAI sequence (not shown), the values of DSFs may be given as [a, a, a, b, b] instead of [0, 0, 0, 0, 0] in the example of FIG. 18(b). Herein, a and b may be 0 and 1 or 1 and 0, respectively.

(6) Configuration of a Plurality of Candidate Resources for SRS and PRACH Transmission To provide a plurality of LBT attempt opportunities for one SRS transmission in a U-band operation situation, various methods of configuring SRS resources and transmitting an SRS from a UE in the SRS resources based on LBT will be proposed below.

A plurality of candidate SRS resources or a plurality of candidate SRS resource sets, which are multiplexed in TDM on the time axis, may be allocated to the UE. The resource index of a candidate SRS resource starting from (or ending in) the last starting (or ending) symbol is defined as a resource index Y. The UE may transmit an SRS only in one SRS resource in which the UE has first succeeded in LBT among the plurality of candidate SRS resources. Alternatively, the UE may transmit the single SRS (repeatedly) over a plurality of SRS resources from the SRS resource in which the UE has first succeeded in LBT to the SRS resource with the resource index Y, among the plurality of candidate SRS resources.

Specifically, in the above-described SRS resource configuration methods, a plurality of sets of candidate SRS resources or candidate starting symbols may be preconfigured by a higher-layer signal (e.g., an SIB or RRC signaling). Then, one of the sets may be indicated by a specific field in a PDCCH (e.g., DL grant DCI). The specific field may be an SRS resource indicator (SRI) field. While candidate SRS resources are mainly described below in relation to the SRI, the following description may also be interpreted by replacing candidate SRS resources with candidate starting symbols. The UE may perform one of the above-described SRS transmission operations based on an indicated candidate SRS resource set.

As described before, the intra-COT A/N transmission operation and the inter-COT A/N transmission operation may be indicated/changed dynamically. A different number of SRS resources may be included in a candidate SRS resource set corresponding to each state indicated by the SRI field (hereinafter, referred to as SRI state). For example, the number of SRS resources for each PRI state may be set to one of $\{1, C(>1)\}$, one of $\{C(>1), D(>A)\}$, or one of $\{1, C(>1), D(>C)\}$.

A plurality of candidate SRS resources in the (same) candidate SRS resource set configured for one SRI state may have the same RB allocation (e.g., the number/indexes of RBs) and different starting/ending symbol positions. For example, the plurality of candidate SRS resources may be configured (in TDM at the slot level) over a plurality of (contiguous) slots, with one SRS resource per slot. Alternatively, the plurality of candidate SRS resources may be configured over one or more (contiguous) slots, with a plurality of resources per slot (in TDM at the symbol level). In another example, a plurality of SRS starting symbols may be configured (in TDM at the slot level) over a plurality of (contiguous) slots, with one starting symbol per slot. Alternatively, the plurality of SRS starting symbols may be configured over one or more (contiguous) slots, with a plurality of starting symbols per slot (in TDM at the symbol level).

Additionally, different LBT types may be configured for a plurality of (TDMed) SRS resources in the same one candidate SRS resource set (particularly, in relation to intra-COT A/N transmission). For example, (when the timing gap between the ending time of a DL transmission and the starting time of a UL (SRS) transmission within a COT is equal to or less than a predetermined value,) LBT type A or X may be configured/applied for/to transmission of some earliest SRS resource(s), and LBT type B or Y may be configured/applied for/to transmission of the remaining SRS resource(s) among the plurality of candidate PUCCH resources.

The SRS transmission method described in the present disclosure is applicable in a similar manner, to an operation of indicating a PRACH transmission to a UE (based on a configuration of a plurality of candidate resources) by a PDCCH/PDSCH. Specifically, the same embodiment may be implemented by replacing 1) SRS resources (or starting symbols) with PRACH resources (or starting symbols) and 2) an SRI field (in a PDCCH (e.g., DCI)) with a PRACH resource indicator (RRI) field.

One CC or BWP configured for the UE in the U-band situation may be configured to be a wideband having a larger BW than in legacy LTE. However, even in this wideband CC/BWP configuration situation, a BW requiring CCA based on an independent LBT operation may be limited (according to a specific rule). As described before, a unit subband in which LBT is performed individually is defined as an LBT-SB. A plurality of LBT-SBs may be included (contiguously or non-contiguously) in one wideband CC/BWP. Based on the above configuration, a plurality of candidate SRS resources in time and/or frequency may be indicated/configured (by RRC signaling and/or DCI) in consideration of LBT failure for an SRS (and the resulting dropping of the SRS transmission) in the U-band situation. The UE may transmit the SRS in a specific (one) resource in which LBT is successful among the plurality of candidate SRS resources.

A plurality of TDMed candidate SRS resources (e.g., a slot or symbol group) in time may be indicated/configured for transmission of a single SRS. These candidate SRS resources may be referred to as candidate T-domain resources. The UE may attempt LBT in the plurality of (time) resources sequentially in time, and transmit the SRS in a specific resource in which CCA is successful (for the first time). Alternatively, a plurality of candidate SRS resources (e.g., LBT-SBs, BWPs, or CCs) distinguished by frequency may be indicated/configured for transmission of a single SRS. These candidate SRS resources may be referred to as candidate F-domain resources. The UE may attempt LBT in the plurality of (frequency) resources (at the same time), and transmit the SRS in a specific resource in which CCA is successful.

In relation to an SRS transmission, candidate SRS resources of which the domain is not explicitly indicated may be candidate T-domain resources in the present disclosure. One candidate T-domain resource may include one or more candidate F-domain resources. A method of allocating SRS resources and transmitting an SRS, based on candidate T/F-domain resources may be considered. In the following description, a specific field of a PDCCH (e.g., DCI) indicating a PDSCH-to-SRS transmission (HARQ) timing may be referred to as an SRS timing indicator (STI) field.

In a method of allocating SRS resources and transmitting an SRS, based on candidate T/F-domain resources, a plurality of candidate T-domain resources may be indicated by an SRI field.

In a method of indicating a plurality of candidate T-domain resources by an SRI field, a candidate SRS resource set including (the same number of) a plurality of candidate T-domain resources may be configured for each SRI state. The candidate T-domain resources of the (same) candidate SRS resource set configured for one SRI state may have the same RB allocation (e.g., the number/indexes of RBs), and different starting or ending symbol positions. For example, the plurality of candidate T-domain resources may be configured (in TDM at the slot level) over a plurality of (consecutive) slots, with one resource per slot. Alternatively, the plurality of candidate T-domain resources may be configured over one or more (consecutive) slots, with a plurality of resources per slot (in TDM at the symbol level). Once candidate SRS resource set(s) including (the same number of) a plurality of candidate T-domain resources are configured for each SRI state, one SRS timing may be configured for each STI state. The SRS timing indicated by the STI field may be the transmission timing of the earliest candidate T-domain resource in one candidate SRS resource set.

Alternatively, in a method of indicating a plurality of candidate T-domain resources by an SRI field, a different number of candidate T-domain resources (in the resource set configured for each SRI state) may be allocated according to an LBT type indicated/configured for an SRS transmission. For example, all of a plurality of candidate T-domain resources included in a candidate SRS resource set may be allocated for LBT type B or Y. For LBT type A or X, only a specific candidate T-domain resource of the candidate SRS resource set may be allocated. The specific candidate T-domain resource may be one earliest candidate T-domain resource.

The UE may transmit the SRS only in one of a plurality of allocated candidate T-domain resources, in which the UE has first succeeded in LBT. Alternatively, the UE may transmit the single SRS (repeatedly) over a plurality of SRS resources from the candidate T-domain resource in which the UE has first succeeded in LBT to a candidate T-domain resource with a resource index Y.

Further, in an A/N PUCCH resource allocation and transmission method based on candidate T/F-domain resources, a plurality of candidate T-domain resources may be indicated by the STI field.

In a method of indicating a candidate T-domain resource by an STI field, a candidate SRS timing set including (the same number of) a plurality of candidate SRS timings (e.g., candidate SRS starting slot/symbol timings) may be configured for each STI state. A candidate SRS timing set for a reference STI state may include minimum timings (e.g. {F1, F2, F3, F4}). A candidate SRS timing set for an HTI state other than the reference STI state may be configured by adding the same (e.g., slot or symbol) offset to the minimum timings (e.g., {F1+c, F2+c, F3+c, F4+c}). Different offsets may be configured for the candidate SRS timing sets of different HTI states. The plurality of minimum timings (e.g. {F1, F2, F3, F4}) may indicate different (contiguous) slots. Alternatively, the plurality of minimum timings may indicate a plurality of different symbol timings in each of one or more (contiguous) slots. When a plurality of different symbol timings in each slot are indicated, the starting symbol of an SRS resource may be determined based on an indicated symbol timing (e.g., on the assumption that the timing is symbol index 0). When a set of (the same number of) a plurality of candidate SRS timings are configured for each STI state, one (T-domain) SRS resource may be configured for each SRI state. The (plurality of) timings of the SRS timing set may be applied as the transmission timings of SRS resources for the respective SRI states.

Further, in a method of indicating a candidate T-domain resource by an STI field, a different number of candidate SRS timings (in the candidate SRS timing set configured for each STI state) may be applied according to an LBT type indicated/configured for an SRS transmission. For example, all of the plurality of candidate SRS timings in the candidate SRS timing set may be applied for LBT type B or Y. For LBT type A or X, only a specific candidate SRS timing of the candidate SRS timing set may be applied. The specific candidate SRS timing may be one earliest candidate SRS timing.

For a plurality of candidate T-domain resources configured by applying a plurality of candidate SRS timings to one SRS resource, the UE may transmit an SRS only in one of the plurality of candidate T domain resources, in which the UE has first succeeded in LBT. Alternatively, the UE may transmit the single SRS (repeatedly) over a plurality of SRS resources from the SRS resource in which the UE has first succeeded in LBT to an SRS resource with a resource index Y, among the plurality of candidate T-domain resources.

Further, in an SRS resource allocation and transmission method based on candidate T/F-domain resources, a plurality of candidate F-domain resources may be indicated by the SRI field.

In a method of indicating a plurality of candidate F-domain resources by an SRI field, a candidate SRS resource set including a plurality of candidate F-domain resources may be configured for each SRI state. For each SRI state, the number of candidate F-domain resources per candidate SRS resource may be the same or different. A plurality of candidate F-domain resources included in the (same) candidate SRS resource set of one PRI state may have different CC/BWP/LBT-SB configurations, the same RB allocation (in each CC/BWP/LBT-SB), and the same starting and/or ending symbol positions.

Alternatively, in a method of indicating a plurality of candidate F-domain resources by an SRI field, a different number of candidate F-domain resources (in the resource set configured for each PRI state) may be allocated according to an LBT type indicated/configured for an SRS transmission. For example, all of the plurality of candidate F-domain resources which are included in the candidate SRS resource set (and/or located in a gNB-initiated COT in frequency) may be allocated for LBT type Y or B, whereas only a specific candidate F-domain resource among the plurality of candidate F-domain resources which are included in the candidate SRS resource set (and/or located in the gNB-initiated COT in frequency) may be allocated for LBT type X or A. The specific candidate F-domain resource may be one candidate F-domain resource located at the lowest frequency.

The UE may attempt LBT in a plurality of allocated candidate F-domain resources (at the same time) and transmit an A/N SRS in a specific resource in which the UE succeeds in CCA.

As described above, the methods of indicating a plurality of candidate T-domain/F-domain resources by an SRI field are applicable to a PRACH transmission of a UE in a similar manner. Specifically, the same embodiment may be implemented by replacing 1) (T-domain/F-domain) SRS resources with (T-domain/F-domain) PRACH resources, 1) an SRI field (in a PDCCH (e.g., DCI)) with an RRI field, 3) an STI field (in a PDCC/DCI) with a PDCCH-to-PRACH timing indicator (RTI) field, and 4) an SRS timing (or starting slot/symbol) with a PRACH timing (or starting slot/symbol).

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 19:
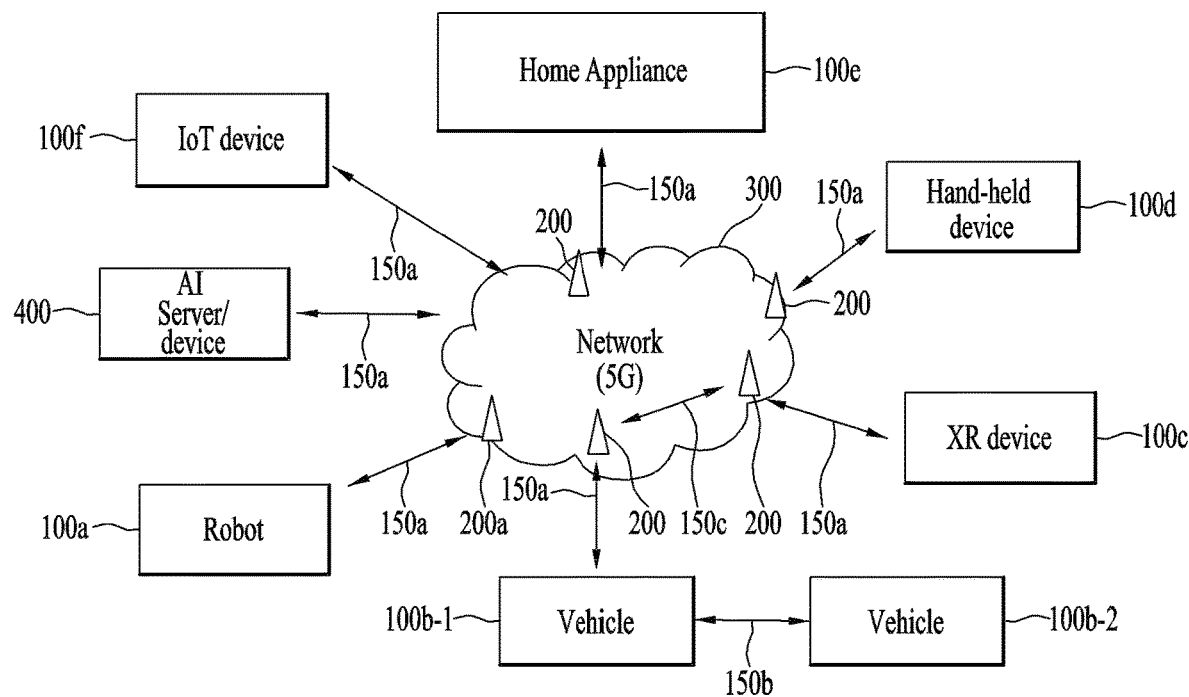
FIGS. 19 to 22 illustrate a communication system 1 and wireless devices, which are applied to the present disclosure.

FIG. 19 illustrates a communication system 1 applied to the present disclosure.

Referring to FIG. 19, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HND), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 20:
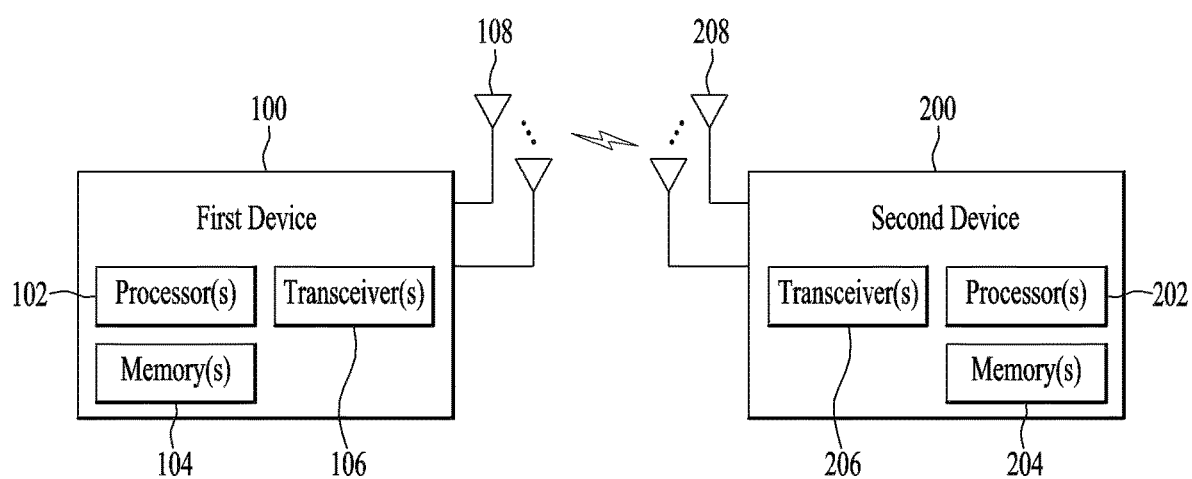

FIG. 20 illustrates wireless devices applicable to the present disclosure.

Referring to FIG. 20, a first wireless device 100 and a second wireless device 200 may transmit wireless signals through a variety of RATs (e.g., LTE and NR). (The first wireless device 100 and the second wireless device 200) may correspond to {the wireless device 100x and the BS 200} and/or {the wireless device 100x and the wireless device 100x} of FIG. 20.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 21:
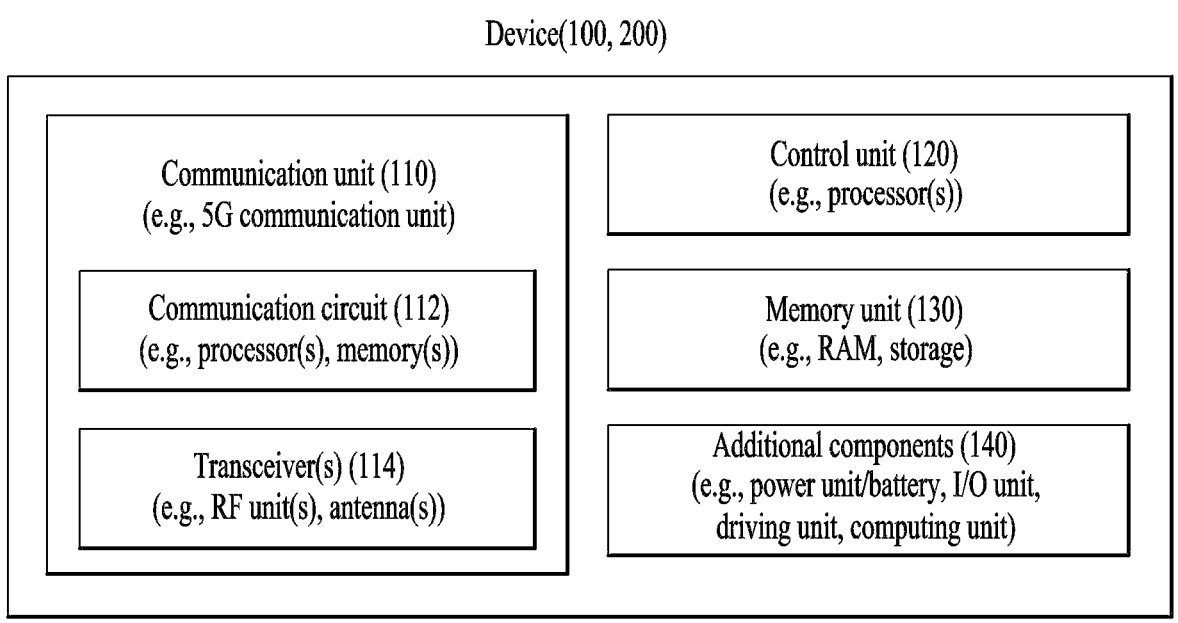

FIG. 21 illustrates another example of a wireless device applied to the present disclosure. The wireless device may be implemented in various forms according to a use case/service (refer to FIG. 19).

Referring to FIG. 21, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcasting terminal, a hologram device, a public safety device, an MTC device, a medical device, a FinTech device (or a finance device), a security device, a climate/environment device, the AI server/device (400 of FIG. 19), the BSs (200 of FIG. 19), a network node, or the like. The wireless device may be mobile or fixed according to a use case/service.

In FIG. 21, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 22:
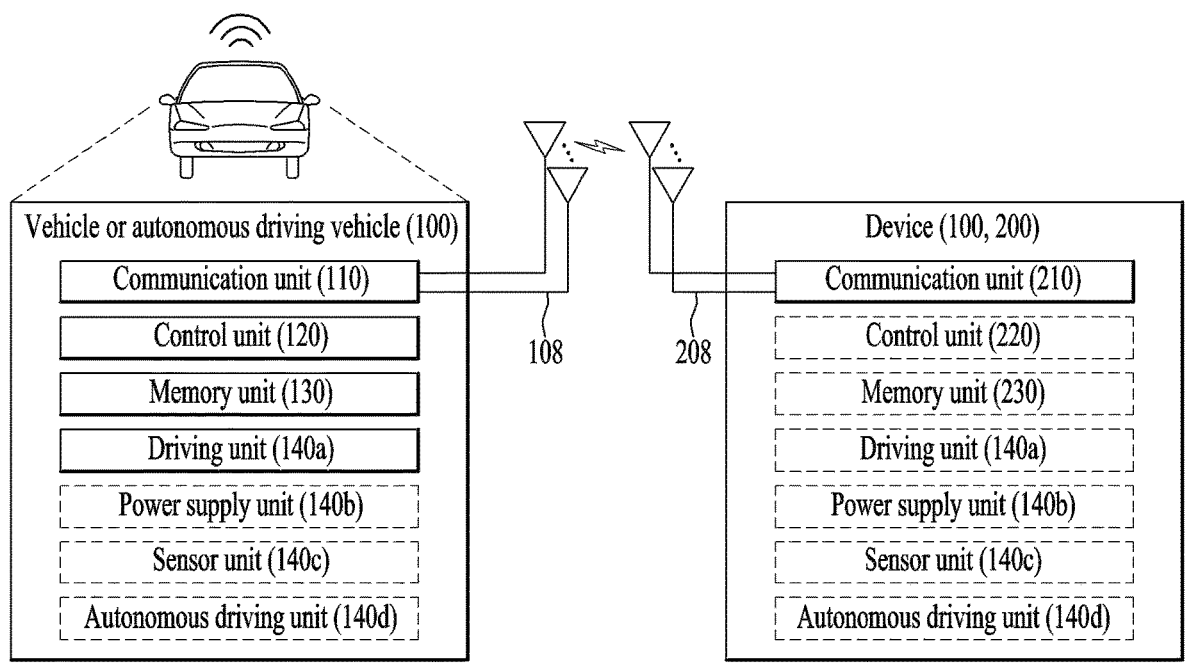

FIG. 22 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a UE, a BS, or other equipment in a wireless mobile communication system.

What is claimed is:

1. A method for transmitting a signal by an apparatus in a wireless communication system, the method comprising:
   receiving physical downlink control channels (PDCCHs), wherein each of the PDCCHs includes 1-bit information and a Downlink Assignment Index (DAI);
   receiving physical downlink shared channels (PDSCHs) based on the PDCCHs; and
   transmitting an Acknowledgement/Negative acknowledgement (A/N) feedback including A/N information for the PDSCHs based on the DAI,
   wherein each PDSCH of the PDSCHs are associated with a corresponding bit value, and PDSCHs with same bit values are included in a same group, and the A/N feedback includes only A/N information for the PDSCHs included in the same group with a same bit value of the 1-bit information.

2. The method of claim 1, wherein the DAI is for scheduling order of the PDSCHs within the same group.

3. The method of claim 1, wherein the A/N feedback is transmitted based on a result of Listen-Before-Talk (LBT) operation.

4. An apparatus used for a wireless communication system, the apparatus comprising:
   at least one processor; and at least one computer memory operably connectable to the at least one processor and storing instructions that, when executed by the at least one processor, perform operations comprising:
      receiving physical downlink control channels (PDCCHs), wherein each of the PDCCHs includes 1-bit information and a Downlink Assignment Index (DAI);
      receiving physical downlink shared channels (PDSCHs) based on the PDCCHs; and
      transmitting an Acknowledgement/Negative acknowledgement (A/N) feedback including A/N information for the PDSCHs based on the DAI,
   wherein each PDSCH of the PDSCHs are associated with a corresponding bit value, and PDSCHs with same bit values are included in a same group, and the A/N feedback includes only A/N information for the PDSCHs included in the same group with a same bit value of the 1-bit information.

5. The apparatus of claim 4, wherein the DAI is for scheduling order of the PDSCHs within the same group.

6. The apparatus of claim 4, wherein the A/N feedback is transmitted based on a result of Listen-Before-Talk (LBT) operation.

7. The apparatus of claim 4, wherein the apparatus is communicable with at least one of a user equipment (UE), a network, a base station (BS), or an autonomous driving vehicle.

* * * * *